(12) United States Patent
Tokunaga et al.

(10) Patent No.: US 6,885,697 B1
(45) Date of Patent: Apr. 26, 2005

(54) METHOD OF SETTING COMMUNICATION BANDS AND COMMUNICATION DEVICE

(75) Inventors: Shingo Tokunaga, Fukuoka (JP); Noriki Kajizaki, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/574,129

(22) Filed: May 18, 2000

(30) Foreign Application Priority Data

Jul. 23, 1999 (JP) .......................................... 11-209118

(51) Int. Cl.[7] ................................................ H04L 5/16
(52) U.S. Cl. ....................... 375/222; 375/240; 375/260; 370/329; 370/437; 370/439; 370/468; 370/477; 455/452; 455/509
(58) Field of Search ................................ 375/219, 220, 375/222, 240, 260, 275, 295, 316, 324, 335, 340; 370/319, 329, 330, 343, 344, 436, 437, 439, 464, 465, 488, 477, 478, 480, 484, 485; 455/450, 452–455, 507, 509

(56) References Cited

U.S. PATENT DOCUMENTS 5,644,573 A * 7/1997 Bingham et al. ........... 370/503
5,818,830 A * 10/1998 Daane et al. ................ 370/347
6,097,733 A * 8/2000 Basu et al. .................. 370/468
6,252,900 B1 * 6/2001 Liu et al. ..................... 375/219
6,532,223 B1 * 3/2003 Sakoda et al. .............. 370/337
6,542,460 B1 * 4/2003 Ring .......................... 370/203

FOREIGN PATENT DOCUMENTS

JP              61021662           1/1986

* cited by examiner

Primary Examiner—Dac V. Ha
(74) Attorney, Agent, or Firm—Katten Muchin Zavis Rosenman

(57) ABSTRACT

A communication band setting method and a communication device that can change a communication band in the ascending and descending directions. The communication device includes a transmission/reception unit that transmits and receives a signal using a plurality of sub carriers, an information storage unit that stores information as to whether each of the plurality of sub carriers is used for transmission or reception, a control unit that changes the information stored in the information storage unit in compliance with a control instruction. A transmission/reception process of the transmission/reception unit is controlled in accordance with the information stored in the information storage unit, so that a transmission band and a reception band are suitably adjusted.

9 Claims, 30 Drawing Sheets

FIG. 13

| CARRIER # | CURRENT COMMUNICATION DIRECTION | NUMBER OF ASSIGNED BITS USED FOR TRANSMISSION |
|---|---|---|
| # 1 | TRANSMISSION | 8 |
| # 2 | TRANSMISSION | 8 |
| # 3 | TRANSMISSION | 8 |
| # 4 | TRANSMISSION | 8 |
| # 5 | TRANSMISSION | 8 |
| # 6 | RECEPTION | 8 |
| # 7 | RECEPTION | 8 |
| # 8 | RECEPTION | 8 |
| # 9 | RECEPTION | 6 |
| # 1 0 | RECEPTION | 6 |
| # 1 1 | RECEPTION | 8 |
| # 1 2 | RECEPTION | 4 |

BOUNDARY CARRIER IN THE TRANSMISSION BAND → # 5

FIG. 18

| | |
|---|---|
| REQUEST | PACKET TYPE DATA |
| RECEPTION INCREASE | REQUEST SEGMENT DATA |
| CHANGED COMMUNICATION RATE (per 1 kbps) | NOTIFICATION DATA |
| CRC 8 | CHECK DATA |

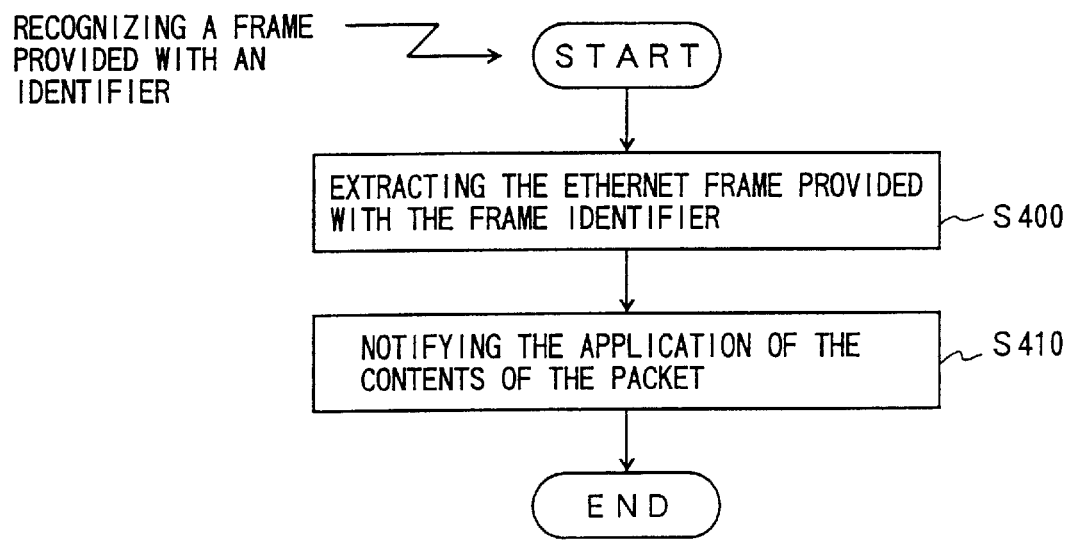

F I G. 3 1
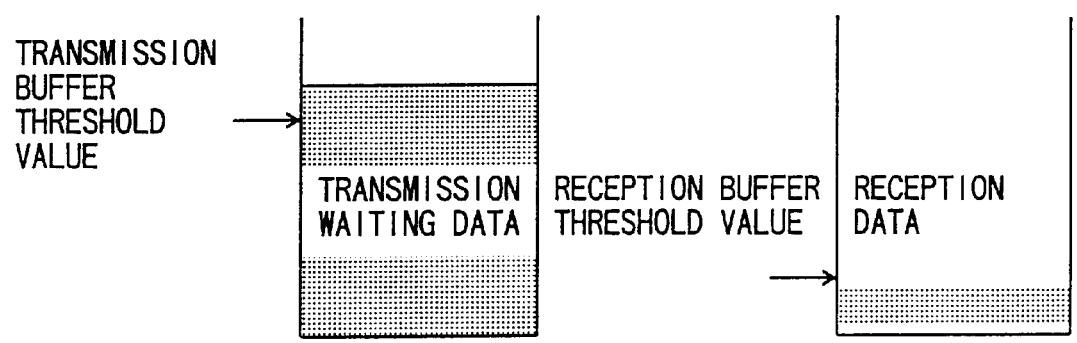

METHOD OF SETTING COMMUNICATION BANDS AND COMMUNICATION DEVICE

BACKGROUND OF THE INVENTION

1. Field of the Invention

The present invention generally relates to methods of setting communication bands and communication devices, and, more particularly, to a method of setting communication bands in the ascending direction (transmitting direction) and the descending direction (receiving direction) and a communication device that operates by that method.

2. Description of the Related Art

In recent years, more and more people have been accessing the Internet not only from offices and schools but also from general households. To make an access to the Internet from a general household, a user has to use a telephone service as a communication line. However, since a telephone service is generally aimed at audio signal transmission, the upper limit of the frequency bandwidth is 4 kHz, and the data transmission speed is restricted accordingly.

To eliminate this problem, an xDSL (x Digital Subscriber Line) system has been employed for communication on the Internet. In the xDSL system, signals having frequencies higher than 4 kHz are transmitted through a telephone line so as to achieve high-speed data communication using neither transmission apparatus nor switching apparatus of a telephone network.

FIG. 1 is a block diagram of an xDSL modem that utilizes a DMT (Discrete Multi-Tone) modulation technique.

An xDSL modem 10 shown in FIG. 1 comprises a data divider 12, a data synthesizer 14, QAM (Quadrature Amplitude Modulation) modulators 16-1 through 16-$m$, QAM demodulators 18$m$+1 through 18$n$, a synthesizer 20, a divider 22, a multiplexer 24, and a D-A/A-D converter 26.

The data divider 12 divides inputted transmission data, taking the influence from noise on the line into consideration, and supplies the divided transmission data to the QAM modulators 16-1 through 16-$m$.

The QAM modulators 16-1 through 16-$m$ modulate the supplied transmission data to generate sub carriers 1 through m each having a bandwidth of about 4 kHz. The synthesizer 20 compounds the sub carriers 1 through m, and transmits the compound to the public switched telephone network via the multiplexer 24 and the D-A/A-D converter 26.

The divider 22 divides a reception signal inputted from the public switched telephone network via the D-A/A-D telephone network 26 and the multiplexer 24 so as to generate sub carriers m+1 through n. The QAM demodulators 18-$m$+1 through 18-$n$ demodulate the sub carriers m+1 through n, and supply the demodulated data to the data synthesizer 14. The data synthesizer 14 compounds reception data from the demodulated data, and outputs the reception data.

FIG. 2 shows the structure of a frequency spectrum in a DMT modulation system. In FIG. 2, a frequency band fa to fb is fixed in the ascending direction (transmitting direction), and a frequency band fc to fd is fixed in the descending direction (receiving direction). For instance, an ADSL (Asymmetric Digital Subscriber Line) system, which is one of xDSL systems, has a descending frequency band wider than its ascending frequency band, in order to be compatible with an access to the Internet from a general household.

In the xDSL modem 10, however, the ascending frequency band and the descending frequency band cannot be changed in accordance with the relationship between the amount of transmission data and the amount of reception data, because both the ascending frequency band fa to fb and the descending frequency band fc to fd are fixed as shown in FIG. 2.

When a user accesses the Internet from a general household, a wide descending frequency band is required for receiving a large amount of data from a homepage, while only a narrow ascending frequency band is used for transmitting request data on the Internet. Still, the conventional xDSL modem 10 cannot change the allocation of the frequency bands in the ascending and descending directions, resulting in poor usage efficiency of the ascending frequency band.

SUMMARY OF THE INVENTION

A general object of the present invention is to provide communication band setting methods and communication devices in which the above disadvantages are eliminated.

A more specific object of the present invention is to provide a communication band setting method and a communication device that can change the allocation of communication bands in the ascending and descending directions.

The above objects of the present invention are achieved by a communication device comprising:

a transmission/reception unit that transmits and receives a signal utilizing a plurality of sub carriers;

an information storage unit that stores information as to whether each of the plurality of sub carriers is used for transmission or reception; and a control unit that changes the information stored in the information storage unit in compliance with a control instruction, wherein a transmission and reception process of the transmission/reception unit is controlled in accordance with the information stored in the information storage unit, so that a transmission band and a reception band are suitably adjusted.

With this communication device, the plurality of sub carriers can be used for either transmission or reception at a particular time. Accordingly, the transmission band and the reception band can be suitably adjusted, and the entire communication band can be efficiently utilized.

The above objects of the present invention are also achieved by a communication band setting method, comprising the steps of:

supplying a control instruction to adjust a transmission band and a reception band;

changing information as to whether each of a plurality of sub carriers for transmitting or receiving a signal is used for transmission or reception in accordance with the control instruction; and adjusting the transmission band and the reception band by carrying out a transmission process or a reception process for each of the plurality of sub carriers in accordance with the information.

By this method, the plurality of sub carriers can be used for either transmission or reception at a particular time. Accordingly, the transmission band and the reception band can be suitably adjusted, and the entire communication band can be efficiently utilized.

The above and other objects and features of the present invention will become more apparent from the following description taken in conjunction with the accompanying drawings.

BRIEF DESCRIPTION OF THE DRAWINGS

FIG. 13 shows an example structure of a management table held by a xDSL modem;

FIG. 18 shows an example structure of a reception band widening request packet;

FIG. 30 is a flowchart of the Ethernet control frame analyzing process in the communication band change process shown in FIG. 25;

FIG. 31 shows an operation of a buffer memory unit of the xDSL modem of the present invention.

DESCRIPTION OF THE PREFERRED EMBODIMENTS

The following is a description of embodiments of the present invention, with reference to the accompanying drawings.

Figure 1:
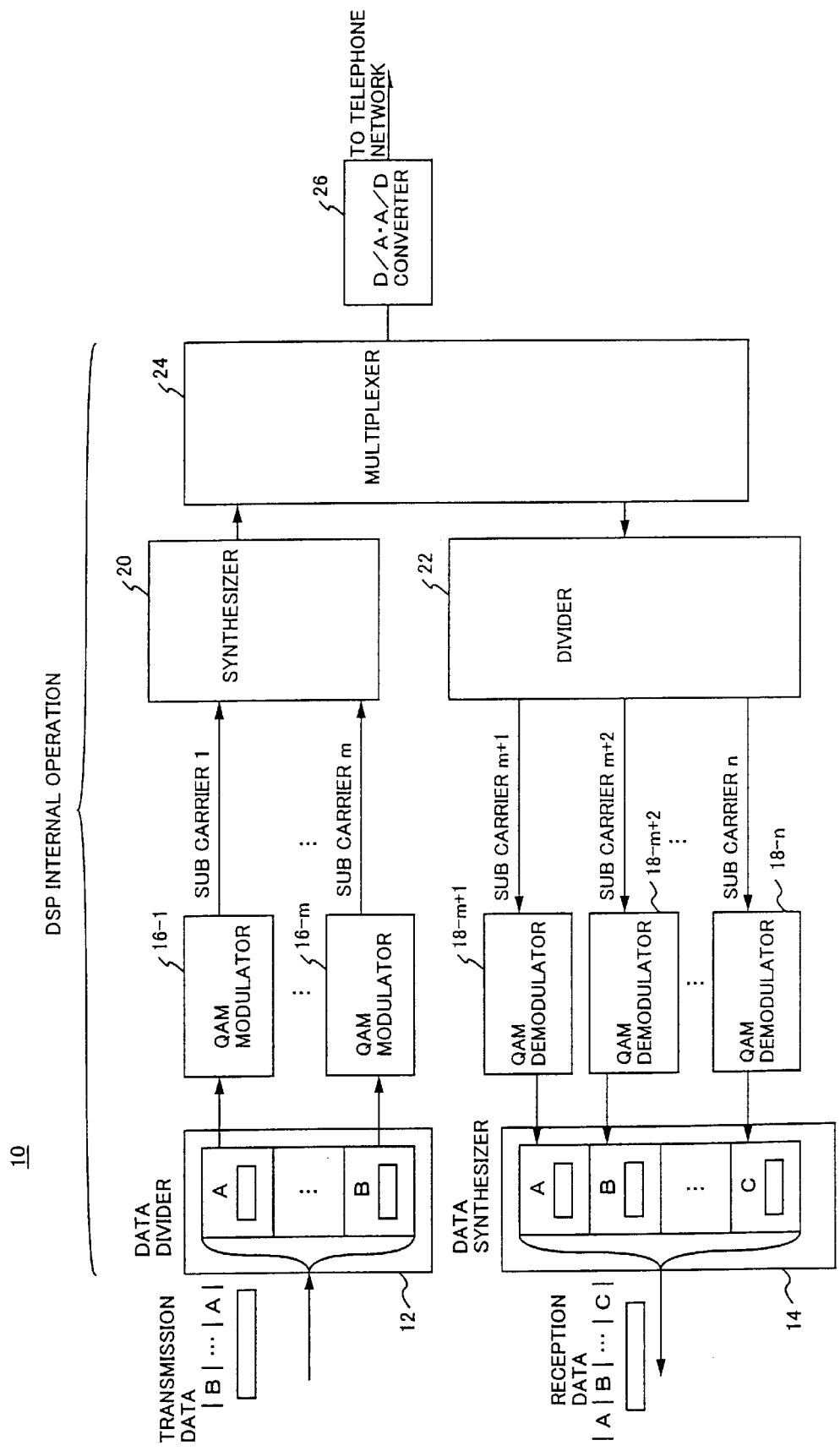
FIG. 1 is a block diagram of a conventional xDSL-modem.
Figure 2:
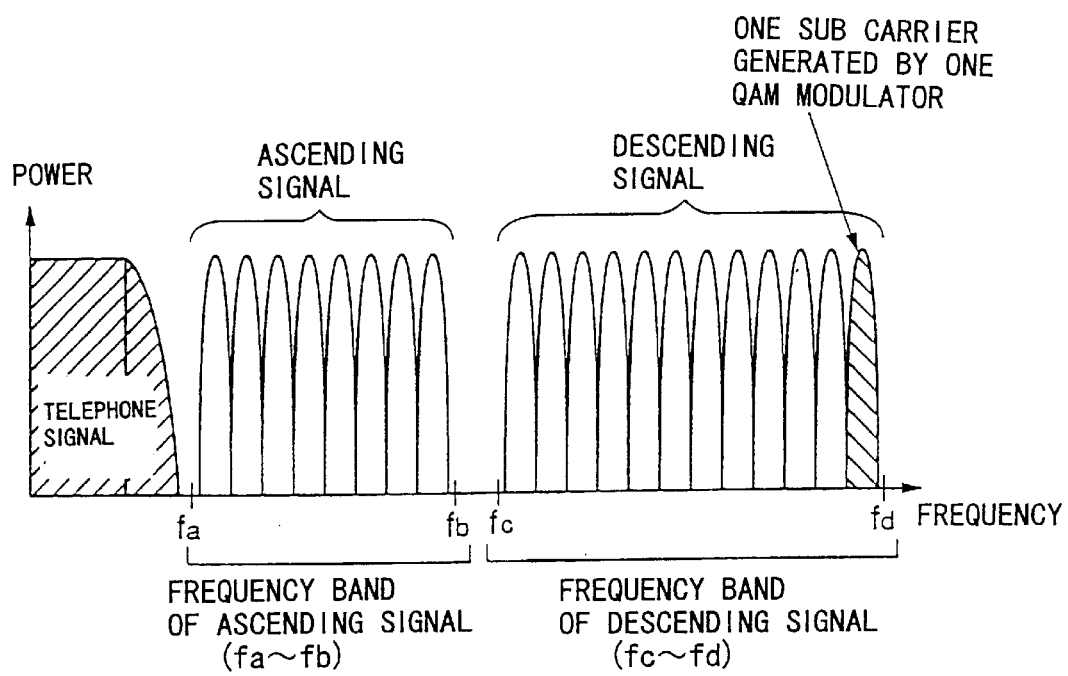
FIG. 2 shows the structure of a frequency spectrum in a DMT modulation system.
Figure 3A:
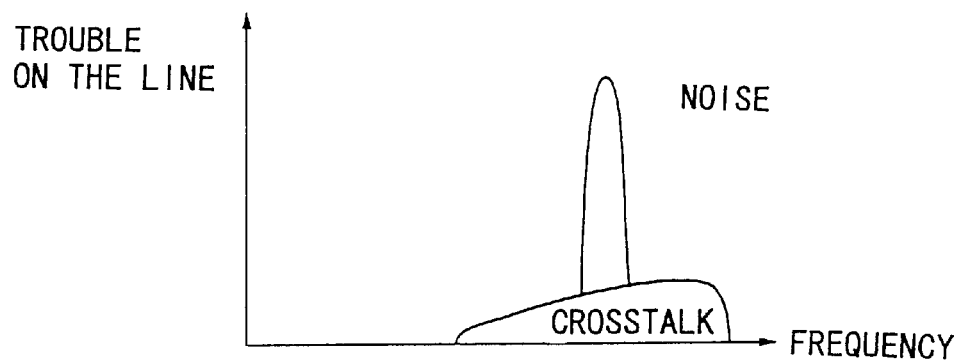
FIGS. 3A and 3B show bits assignment in a DMT modulation system.
Figure 3B:
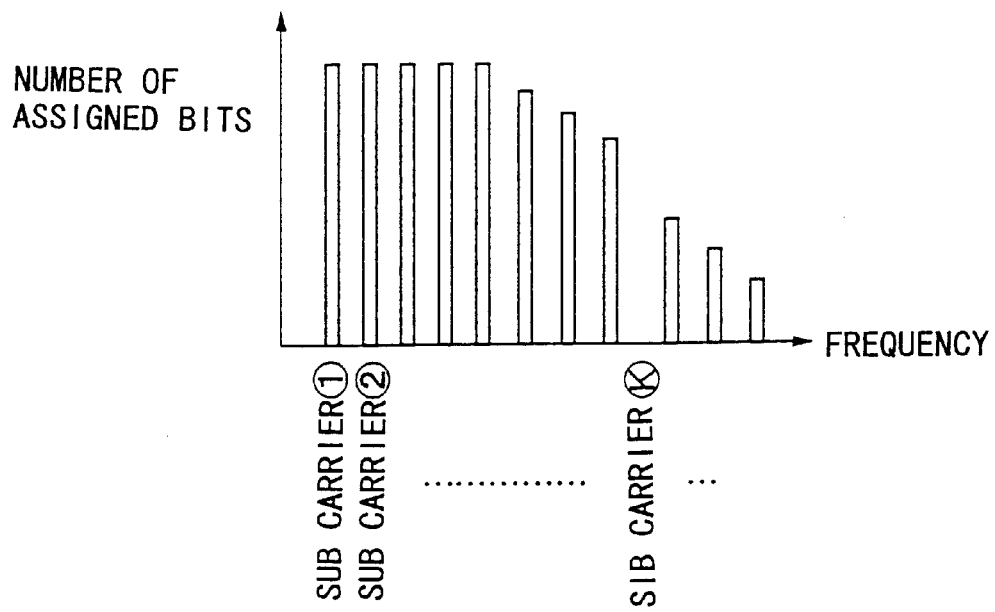
Figure 4A:
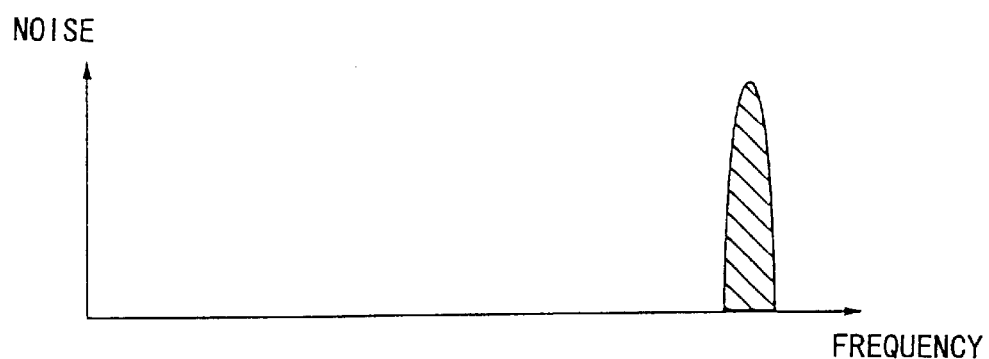
FIGS. 4A and 4B show a change in sub carrier usage in the DMT modulation system.
Figure 4B:
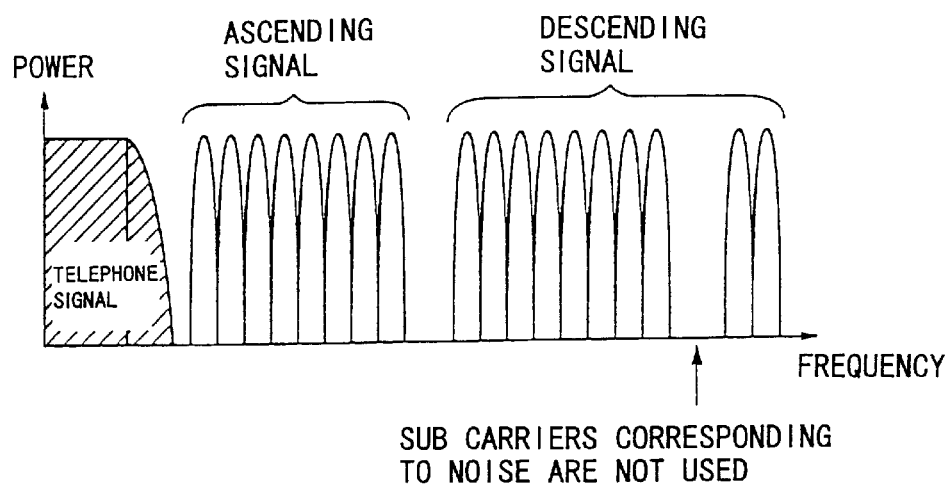

FIGS. 3A and 3B show bits assignment in a DMT modulation system. FIGS. 4A and 4B show a change in sub carrier usage in the DMT modulation system.

FIG. 3A shows crosstalk and noise that have occurred on the line. In the DMT modulation system, the number of bits assigned to high-frequency sub carriers is reduced due to the crosstalk, and the number of bits assigned to a sub carrier k is zero due to the noise, as shown in FIG. 3B. In this manner, the number of bits assigned to each sub carrier is adjusted in accordance with noise and/or crosstalk on the line.

Where noise occurs in a descending transmission band as shown in FIG. 4A, two sub carriers in the descending direction are not used as shown in FIG. 4B. As a result, the descending transmission band becomes narrower due to the noise on the line.

Since a wide transmission band is required in the descending direction while only a narrow transmission band is required in the ascending direction, a part of the ascending transmission band can be used as a part of the descending transmission band in accordance with the present invention.

Figure 5A:
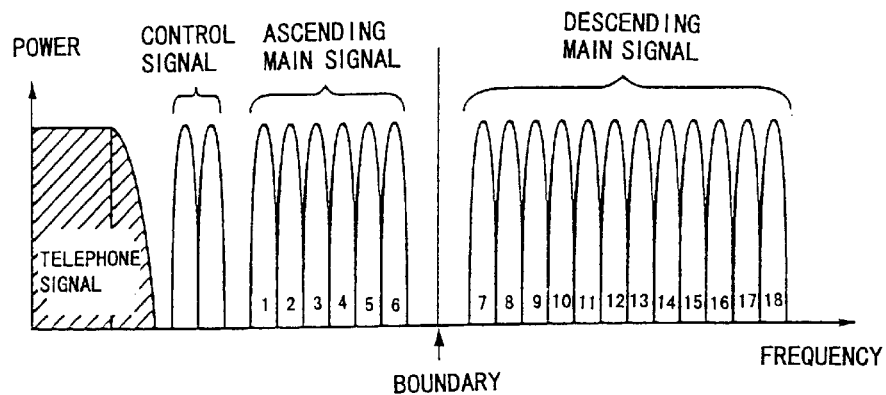
FIGS. 5A through 5C show a frequency spectrum that is illustrative of a feature of the present invention.
Figure 5B:
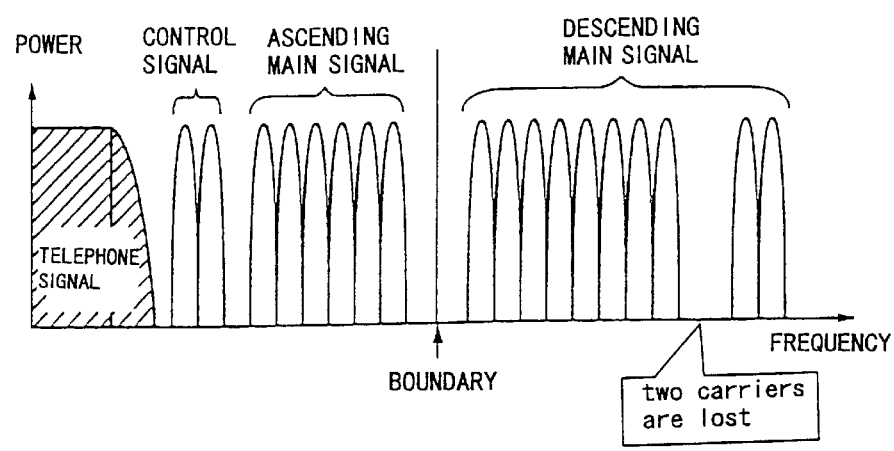
Figure 5C:
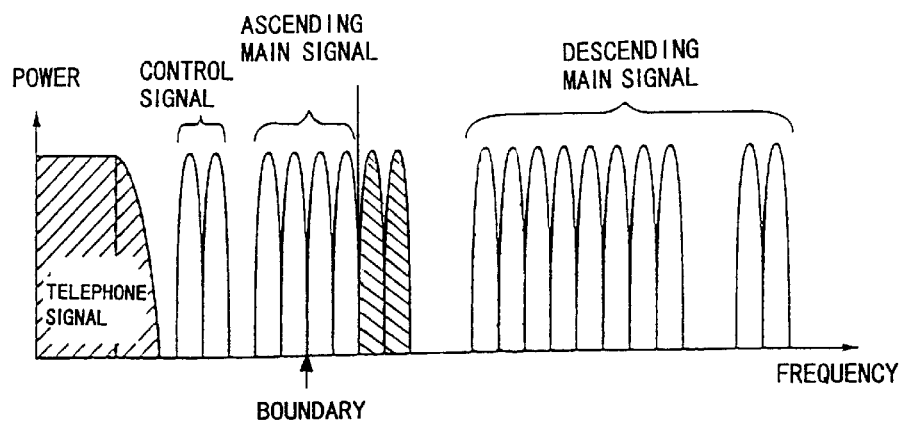

FIGS. 5A through 5C show a frequency spectrum that is illustrative of a feature of the present invention. In the present invention, control signals (described later) utilize an upper transmission band of a signal transmitted on a normal telephone line.

If the sub carriers in the descending transmission band are reduced by 2 due to noise on the line, as shown in FIG. 5B, two of the sub carriers in the ascending transmission band are used as sub carriers in the descending transmission band, as shown in FIG. 5C. In other words, the boundary line between the ascending transmission band and the descending transmission band is suitably moved in the present invention, so that the allocation of the transmission bands in the ascending and descending directions can be changed in accordance with the relationship between the amount of transmission data and the amount of reception data.

Figure 6:
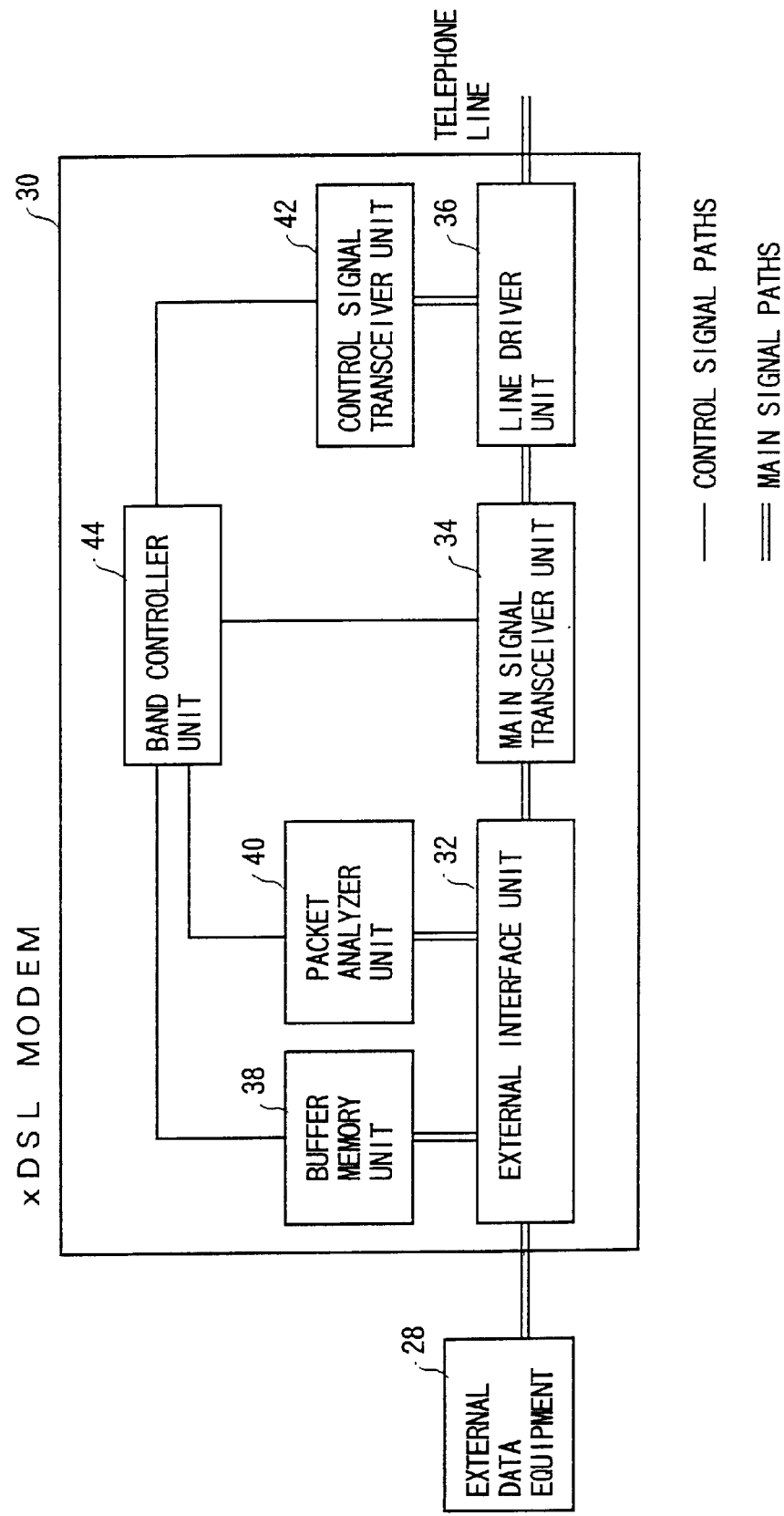
FIG. 6 is a block diagram of am embodiment of a communication device in accordance with the present invention.

FIG. 6 is a block diagram of an xDSL modem 30 having a communication band setting function as an embodiment of a communication device of the present invention. The xDSL modem 30 comprises an external interface unit 32, a main signal transceiver unit 34, a line driver unit 36, a buffer memory unit 38, a packet analyzer unit 40, a control signal transceiver unit 42, and a band controller unit 44. The packet analyzer unit 40, the control signal transceiver unit 42, and the band controller unit 44 are newly employed in the present invention.

The external interface unit 32 interfaces the xDSL modem 30 with external data equipment (terminal) 28, and converts between an external data-packet and an xDSL frame. In order to recognize a control packet from the external data equipment 28, the external interface unit 22 also sends a packet from the external data equipment 28 to the packet analyzer 40.

The main signal transceiver unit 34 modulates and demodulates a main signal in a manner according to a DMT system. When modulating, the main signal transceiver unit 34 assigns data bits to each sub carrier in compliance with instructions from the band controller unit 44, compounds all the sub carriers after the QAM modulation, and outputs the sub carrier compound to the line driver unit 36. When demodulating, the main signal transceiver unit 34 divides a reception signal into the sub carriers in compliance with instructions from the band controller unit 44, and subjects the sub carriers to the QAM modulation. The main signal transceiver unit 34 is constituted by a DSP (Digital Signal Processor) and a D-A/A-D converter, for instance.

The line driver unit 36 distributes a reception signal from the telephone line network to the main signal transceiver unit 34 and the control signal transceiver unit 42. The line driver unit 36 also outputs a transmission signal from the main signal transceiver unit 34 and the control signal transceiver unit 42 to the telephone line network. The line driver unit 36 carries out 2-4 wire conversion, transmission level adjustment, and impedance matching, so as to connect the main signal transceiver unit 34 and the control signal transceiver unit 42 to the telephone line network.

The buffer memory unit 38 temporarily stores transmission and reception data, and the amount of transmission and reception data stored in the buffer memory 38 is monitored by the band controller unit 44.

The packet analyzer unit 40 recognizes a control packet sent from the external data equipment 28, and instructs the band controller unit 44 to perform a communication band change process in response to a communication band change request contained in the control packet.

The control signal transceiver unit 42 extracts a control signal from a reception signal supplied from the line driver unit 36, and demodulates the control signal. The demodulated control signal is supplied to the band controller unit 44. The control signal transceiver unit 42 also modulates a control signal supplied from the band controller unit 44, and outputs the modulated control signal to the line driver unit 36. The control transceiver unit 42 can be constituted by a DSP and a D-A/A-D converter, for instance.

The band controller unit 44 detects a communication band change request from the packet analyzer unit 40 and the control signal transceiver unit 42, and the amount of transmission and reception data stored in the buffer memory unit 38. The band controller unit 44 also carried out a negotiation process with an opposite xDSL modem. To carry out the negotiation process, the band controller unit 44 supervises the conditions of the bands, supplies a control signal to the control signal transceiver unit 42, and also supplies a control signal to the main signal transceiver unit 34.

Figure 7:
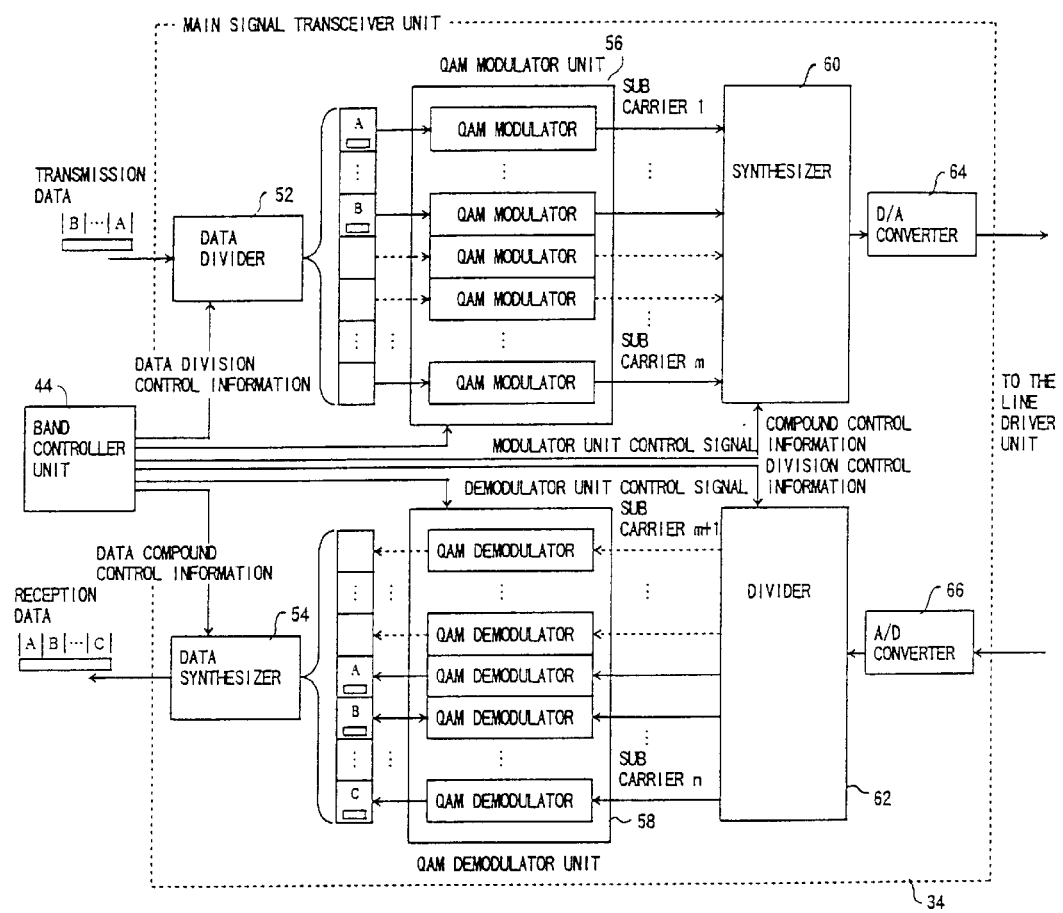
FIG. 7 is a block diagram of a main signal transceiver unit in the communication device of the present invention.

FIG. 7 shows the structure of the main signal transceiver unit 34 of the xDSL modem 30 shown in FIG. 6. The main signal transceiver unit 34 comprises a data divider 52, a data synthesizer 54, a QAM modulator unit 56 made up of a plurality of QAM modulators, a QAM demodulator unit 58 made up of a plurality of QAM demodulators, a synthesizer 60, a divider 62, a D-A converter 64, and a A-D converter 66.

The data divider 52 divides inputted transmission data and allocates the divided transmission data into channels in the ascending direction, in compliance with a data division control information supplied from the band controller unit 44. The allocated transmission data are supplied to the QAM modulator unit 56. The QAM modulator unit 56 modulates the transmission data at different sub carriers so as to generate sub carriers 1 through m each having a frequency width of about 4 kHz, in accordance with modulation unit control information supplied from the band controller unit 44.

The synthesizer 60 compounds the sub carriers 1 through m in accordance with compound control information supplied from the band controller unit 44, and supplies the sub carrier compound to the D-A converter 64. The D-A converter 64 converts the supplied digital signal into an analog signal, and outputs the analog signal to the line driver unit 36.

The A-D converter 66 converts an analog signal supplied from the line driver unit 36 into a digital signal, and sends the digital signal to the divider 62. The divider 62 generates sub carriers m+1 through n from the supplied digital signal in accordance with division control information supplied from the band controller unit 44.

The QAM demodulator unit 58 demodulates the sub carriers m+1 through n in accordance with demodulator unit control information supplied from the band controller unit 44. The data synthesizer 54 compounds the demodulated sub carriers into reception data in accordance with data compound control information supplied from the band controller unit 44.

Figure 8:
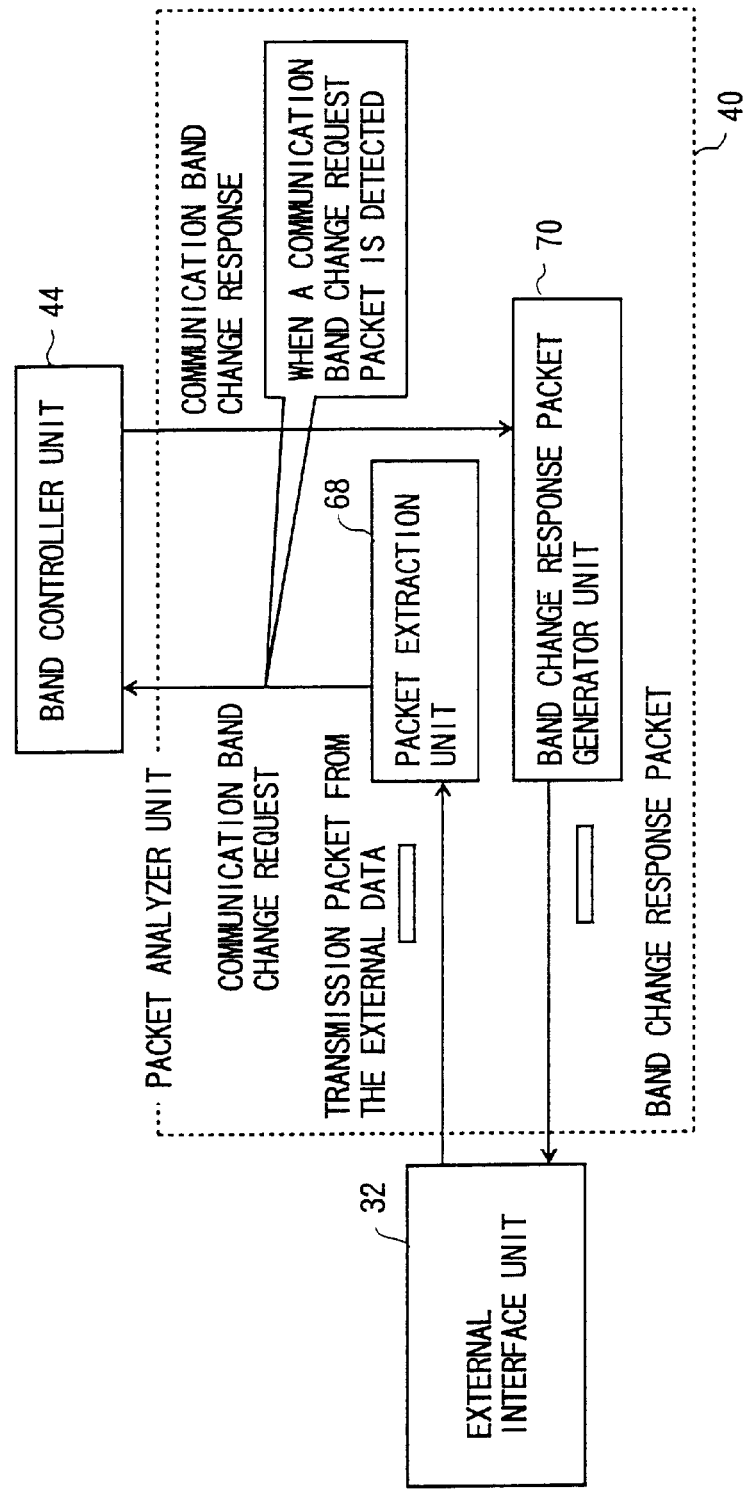
FIG. 8 is a block diagram of a packet analyzer unit in the communication device of the present invention.

FIG. 8 shows the structure of the packet analyzer 40 of the xDSL modem 30 shown in FIG. 6. The packet analyzer 40 comprises a packet extraction unit 68 and a band change response packet generator unit 70.

The packet extraction unit 68 extracts a control packet supplied from the external interface unit 32, and instructs the band controller unit 44 to perform the communication band change process in compliance with a communication band change request contained in the control packet. The band change response packet generator unit 70 generates a band change response packet in accordance with a communication band change response supplied from the band controller unit 44, and supplies the band change response packet to the external interface unit 32.

Figure 9:
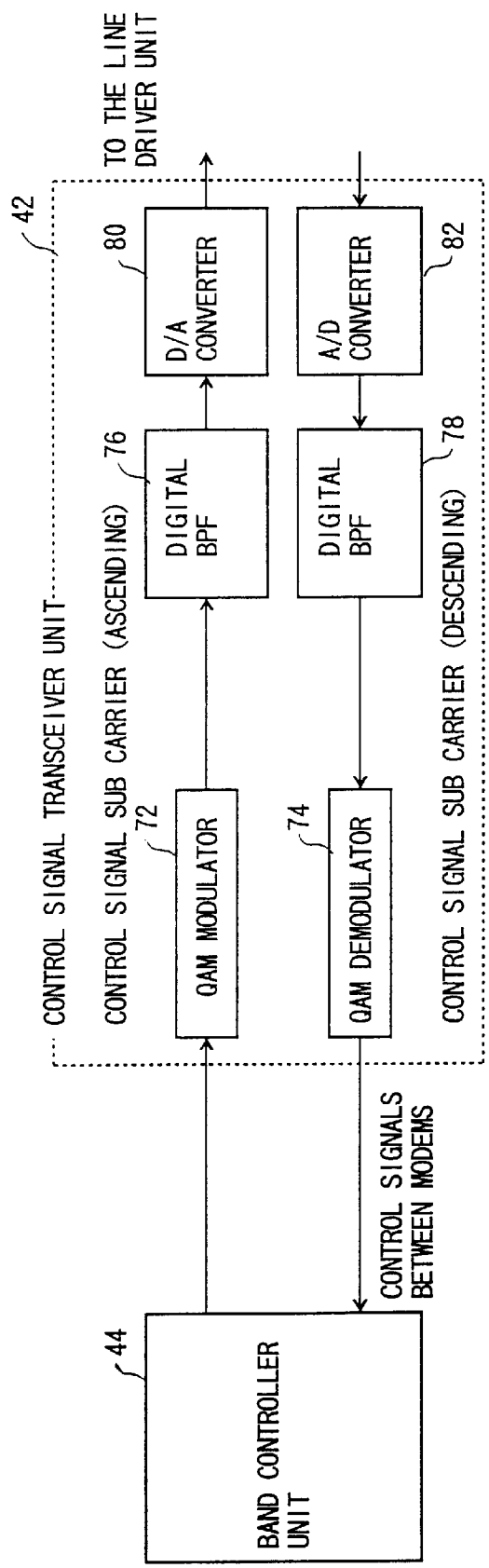
FIG. 9 is a block diagram of a control signal transceiver unit in the communication device of the present invention.

FIG. 9 shows the structure of the control signal transceiver unit 42 of the xDSL modem 30 shown in FIG. 6. The control signal transceiver unit 42 comprises a QAM modulator 72, a QAM demodulator 74, digital BPFs (Band Pass Filters) 76 and 78, a D-A converter 80, and an A-D converter 82.

The QAM modulator 72 modulates an ascending-direction control signal supplied from the band controller unit 44, and sends the control signal to the D-A converter 80 via the digital BPF 76. The D-A converter 80 converts the digital control signal into an analog control signal, and outputs the analog control signal to the line driver unit 36.

The A-D converter 82 converts an analog reception signal supplied from the line driver unit 36 into a digital reception signal, and sends the digital reception signal to the digital BPF 78. The digital BPF 78 extracts a descending-direction control signal from the digital reception signal, and supplies the control signal to the QAM demodulator 74. The QAM demodulator 74 demodulates the descending-direction control signal, and outputs the demodulated control signal to the band controller unit 44.

Figure 10:
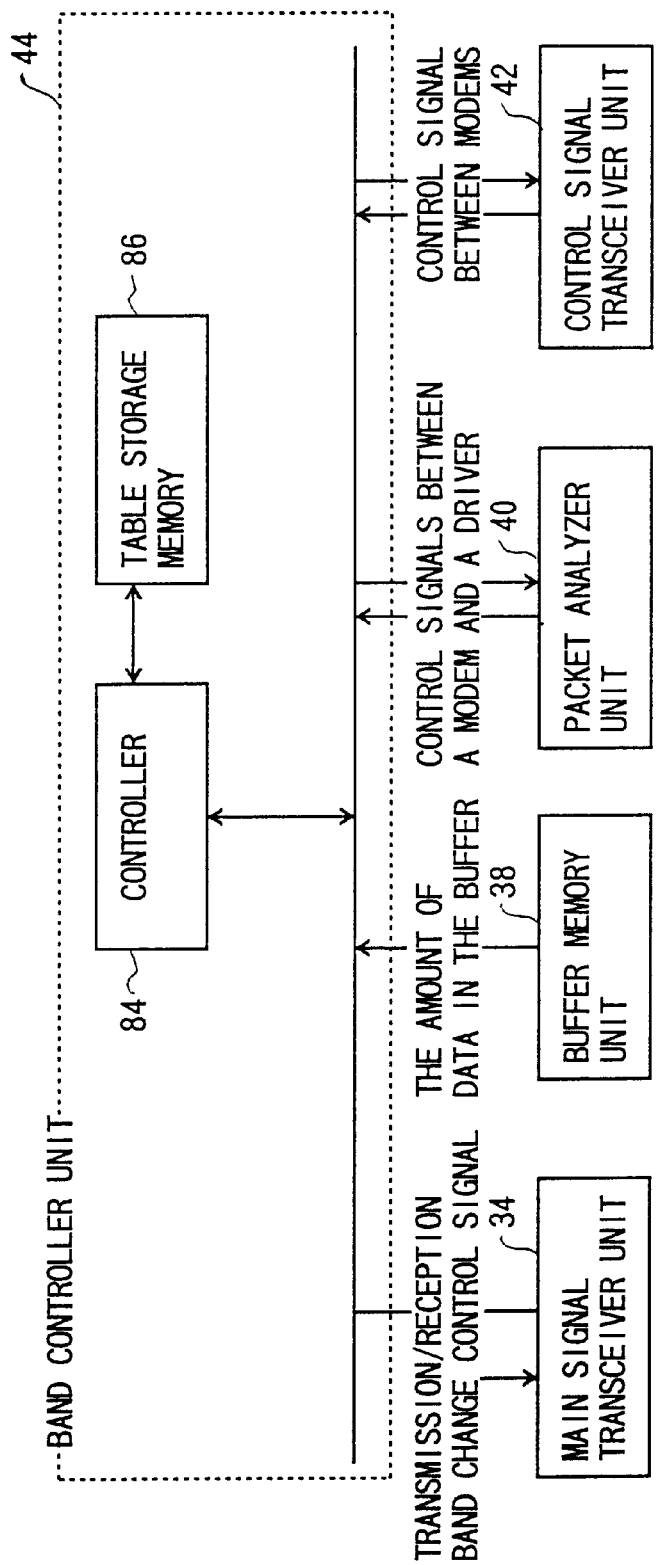
FIG. 10 is a block diagram of a band controller unit in/the communication device of the present inventions.

FIG. 10 shows the structure of the band controller unit 44 of the xDSL modem 30 shown in FIG. 6. The band controller unit 44 comprises a controller 84 and a table storage memory 86.

The controller 84 supplies a control signal for a transmission and reception band change to the main signal transceiver unit 34. The controller 84 receives a notification signal as to the amount of transmission and reception data stored in the buffer memory unit 38.

A control signal for performing the communication band change process in compliance with an instruction from the external data equipment 28 is transmitted and received between the controller 84 and the packet analyzer unit 40. Also, a control signal for performing the communication band change process in compliance with an instruction from another xDSL modem is transmitted and received between the controller 84 and the control signal transceiver 42. The table storage memory 86 stores information including the transmitting and receiving direction of each sub carrier and the number of bits assigned to each sub carrier.

Figure 11:
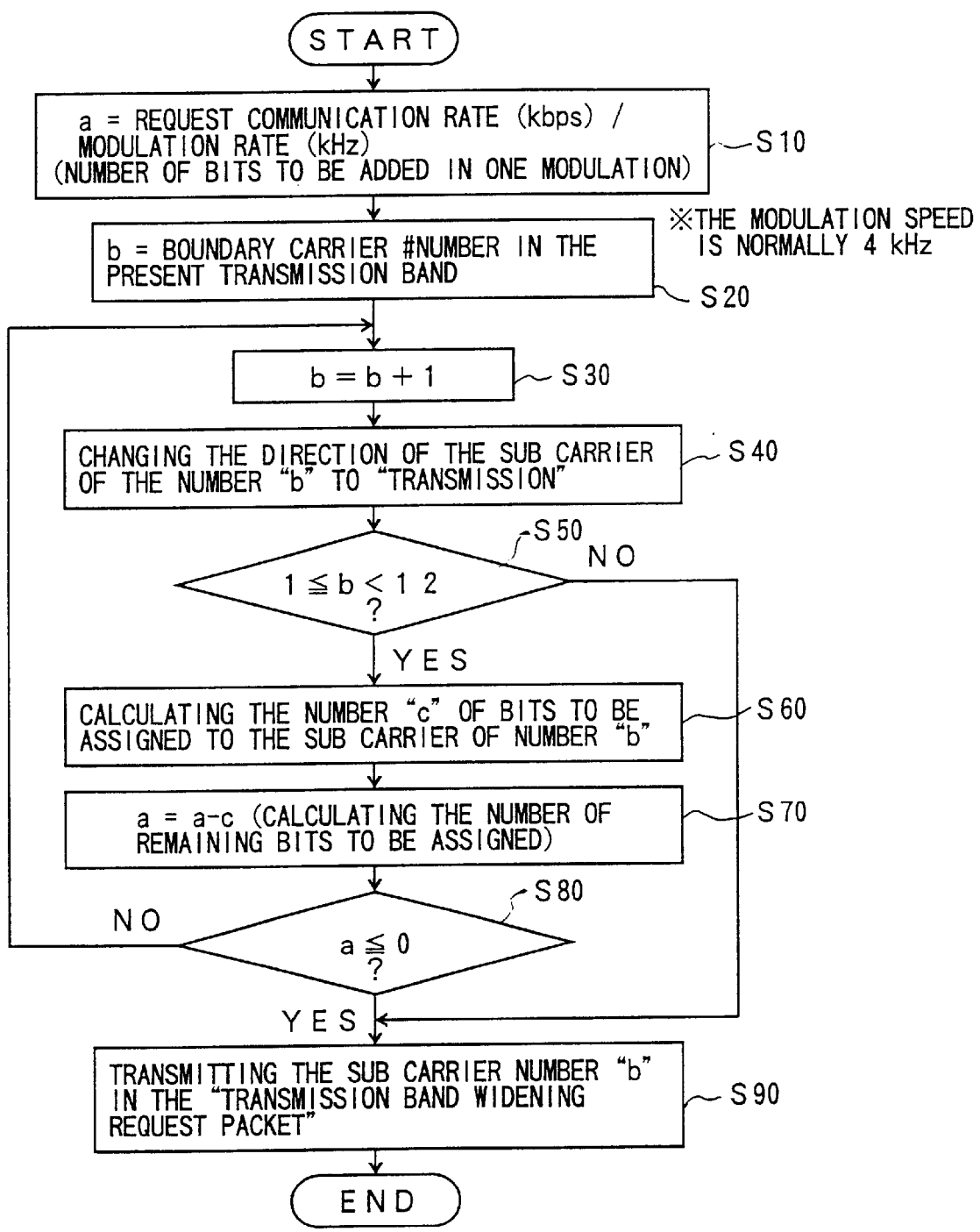
FIG. 11 is a flowchart of a process of calculating the assigned number of sub carriers.

FIG. 11 is a flowchart of a process of calculating the assigned number of sub carriers carried out by the band controller unit 44. In this example, the ascending transmission band is widened.

In step S10, the number "a" of bits required to satisfy a request communication rate (kbps) is calculated by a formula (1):

$$A = \text{request communication rate (kbps)/modulation speed (kHZ)} \quad (1).$$

In step S20, the number "b" of the boundary sub carrier in the present transmission band is determined. In FIG. 5A, for instance, the number "b" of the boundary sub carrier in the transmission band is "6". In step S30, "1" is added to the number "b" determined in step S20.

In step S40, the sub carrier of number "b" is switched from reception to transmission. In FIG. 5A, for instance, the sub carrier of number "7" is switched from reception to transmission. In step S50, it is determined whether the number "b" satisfies the relationship expressed as:

$$1 \leq b < n \quad (2)$$

wherein "n" indicates the number of sub carriers in the transmission band.

If the number "b" does not satisfy the relationship (2), the operation moves on to step S90. If it is determined that the number b satisfies the relationship (2), the operation moves on to step S60. In step S60, a bit number "c" that can be assigned to the sub carrier of number "b" is determined. In step S70, a bit number "a" that is the number of remaining bits to be assigned is calculated by the following formula (3):

$$a = a - c \quad (3).$$

In step S80, it is determined whether the number "a" of remaining assigned bits is smaller than 1. If it is smaller than 1, the operation moves on to step S90. If it is not smaller than 1, the operation returns to step 30, and the subsequent steps are repeated.

In step S90, the number "b" of the sub carrier is attached to a transmission band widening request packet to be transmitted. In this manner, the number of assigned sub carriers can be calculated. Although the assigned sub carrier number calculation for increasing the transmission band (ascending direction) has been described above, the same technique can be applied to an operation to widen the reception band (descending direction).

Figure 12:
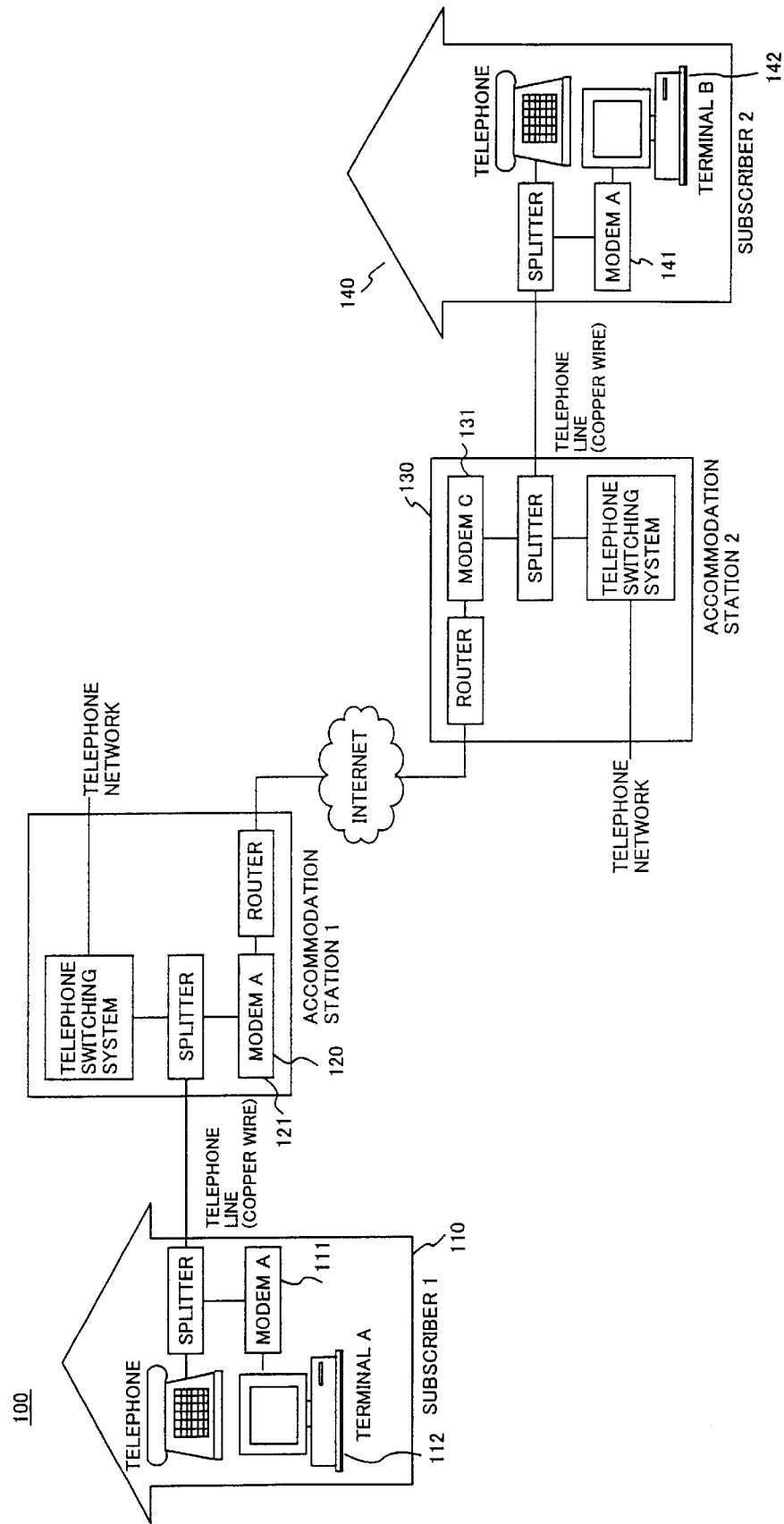
FIG. 12 shows the structure of a network utilizing xDSL modems.

FIG. 12 shows a structure of a network in which the xDSL modem 30 is employed. In a network 100 shown in FIG. 12, subscribers 110 and 140 are connected by accommodation stations 120 and 130 via the Internet network. For example, a modem 111 of the subscriber 110 receives a request to widen the communication band from the modem 111 to the accommodation station 120 by 32 kbps. The modem 111 and a modem 121 each have a management table in which the number of bits assigned to each sub carrier and the communication direction of each sub carrier are set.

FIG. 13 shows a management table. This table is held in the modem 111 of the subscriber 110. According to this table, sub carriers #1 through #5 are used as the transmission band, while sub carriers "#6 through #12 are used as the reception band.

Figure 14:
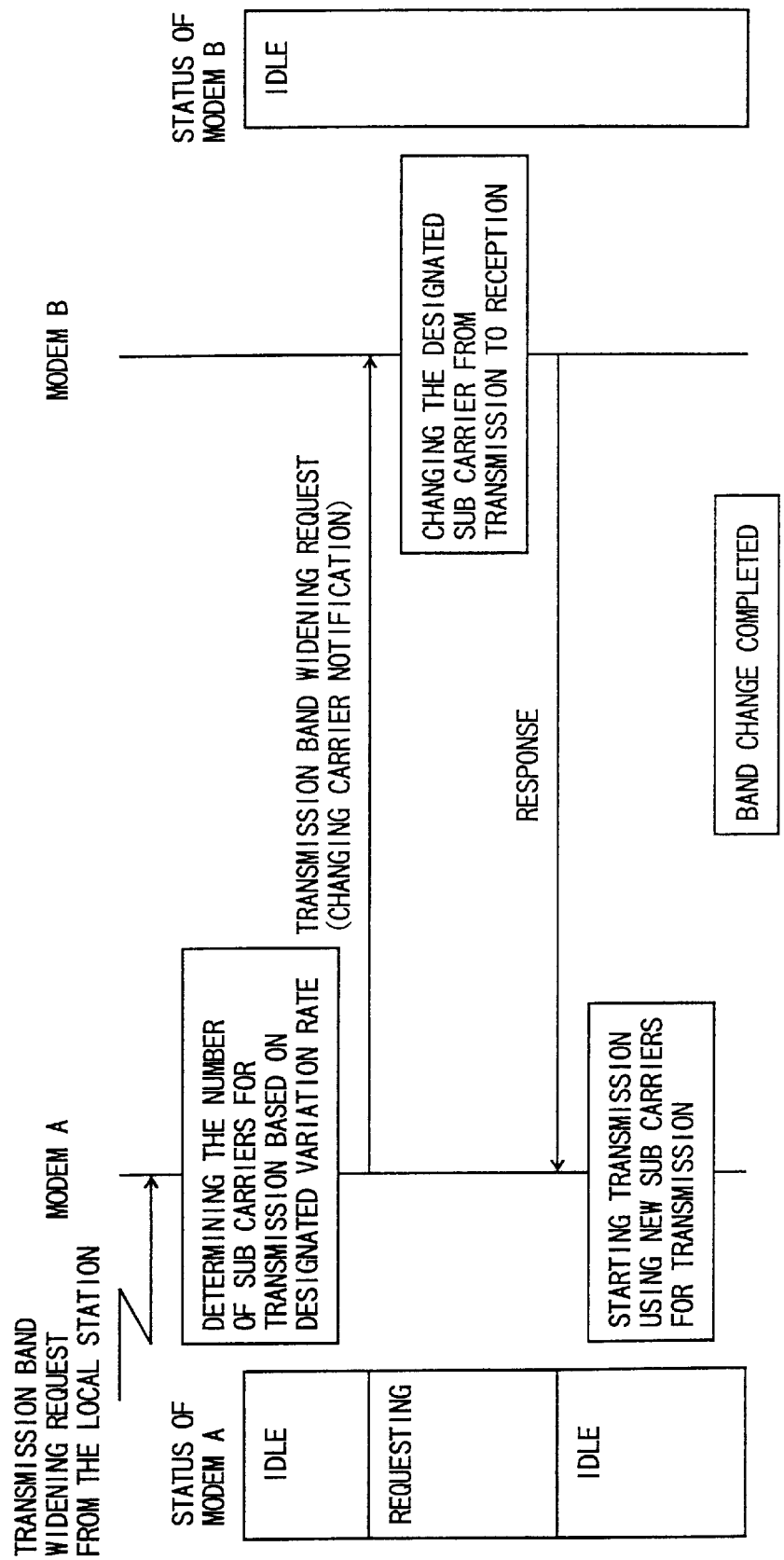
FIG. 14 is a sequence diagram of a transmission band change process.

FIG. 14 is a sequence diagram of a transmission band change process. When the modem 111 receives a transmission band widening request, the band controller unit 44 of the modem 111 calculates how many sub carriers in the reception band should be switched to the transmission band to widen the transmission band by 32 kbps in the assigned sub carrier number calculation process shown in FIG. 11.

Figure 15:
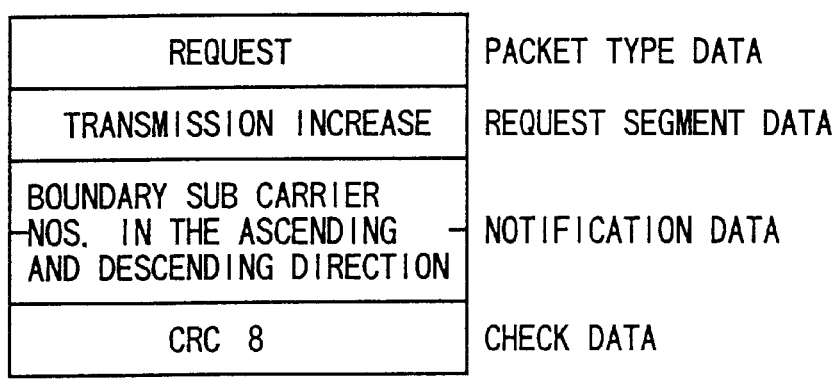
FIG. 15 shows an example structure of a transmission band widening request packet.

The band controller unit 44 generates a transmission band widening request packet based on the calculation result, and supplies it to the control signal transceiver unit 42. FIG. 15 shows an example structure of the transmission band widening request packet. This transmission band widening request packet includes packet type data, request segment data, notification data, and check data.

The transmission band widening request packet is modulated into an ascending control signal by the control signal transceiver unit 42. This control signal is supplied to the line driver unit 36, and compounded with a transmission signal generated by the main signal transceiver unit 34. The signal compound is then transmitted to the modem 121 of the accommodation station 120.

The control signal transceiver unit 42 of the modem 121 of the accommodation station 120 receives a descending control signal via the line driver unit 36. The control signal transceiver unit 42 demodulates the control signal in the descending direction to generate a transmission band widening request packet, and supplies the transmission band widening request packet to the band controller unit 44.

Figure 16:
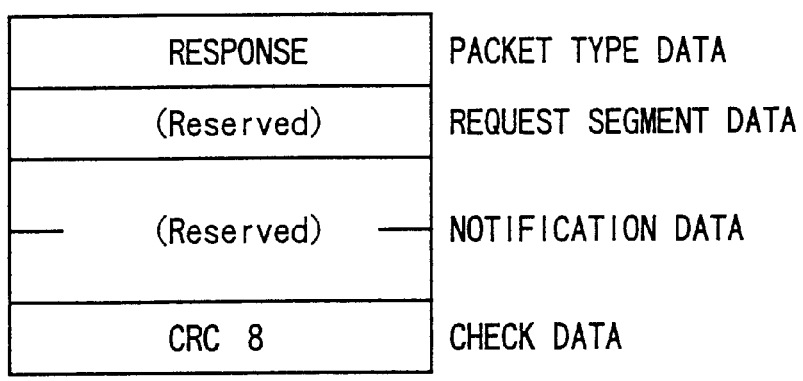
FIG. 16 shows an example structure of a band change response packet.

The band controller unit 44 then changes the sub carriers designated in the management table from the transmission band to the reception band in accordance with the information in the transmission band widening request packet. The band controller unit 44 also notifies the main signal transceiver unit 34 of the transmission stop of the designated sub carriers. The band controller unit 44 then generates and supplies a band change response packet to the control signal transceiver unit 42. FIG. 16 shows an example structure of the band change response packet. This band change response packet includes packet type data, request segment data, notification data, and check data. However, the request segment data and the notification data of the band change response packet are not used (reserved).

The band change response packet is modulated into an ascending control signal by the control signal transceiver unit 42. This control signal is supplied to the line driver unit 36, and is compounded with a transmission signal generated by the main signal transceiver unit 34. The compound signal is then transmitted to the modem 111 of the subscriber 110.

Meanwhile, the control signal transceiver unit 42 of the modem 111 of the subscriber 110 receives a descending control signal via the line driver unit 36. The control signal transceiver unit 42 demodulates the descending control signal to generate a band change response packet, and supplies the band change response packet to the band controller unit 44.

The band controller unit 44 instructs the main signal transceiver unit 34 to start transmission in the ascending direction through the designated sub carriers in accordance with the information in the band change response packet.

In the above manner, the communication band from the modem 111 of the subscriber 110 to the modem 121 of the accommodation station 120 can be widened by 32 kbps, and the communication band from the modem 121 of the accommodation station 120 to the modem 111 of the subscriber 110 can be narrowed by 32 kbps.

In the next example case, the modem 111 of the subscriber 110 receives a request to widen the communication band from the accommodation station 120 to the subscriber 110 by 32 kbps. In the following description, the same steps as in the transmission band change process will be omitted, but it should be understood that they are also albe to be carried out in a reception band change process.

Figure 17:
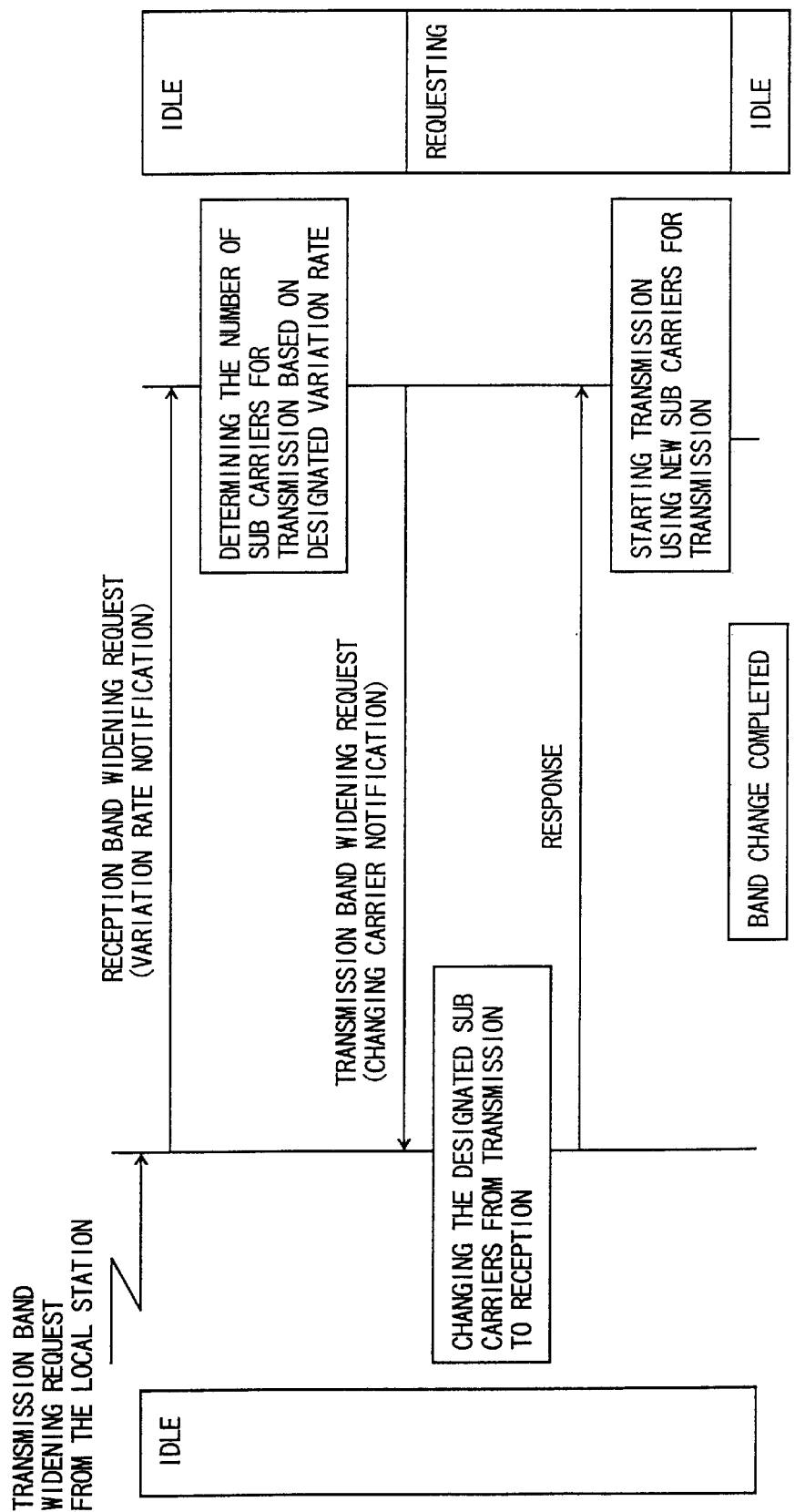
FIG. 17 is a sequence diagram of a reception band change process.

FIG. 17 is a sequence diagram of a reception band change process. When the modem 111 of the subscriber 110 receives a reception band widening request, the band controller unit 44 of the modem 111 generates a reception band widening request packet for increasing the descending reception band by 32 kbps, and transmits the reception band widening request packet to the modem 121 of the accommodation station 120.

FIG. 18 shows an example structure of the reception band widening request packet. This reception band widening request packet includes packet type data, request segment data, notification data, and check data.

Upon receipt of the reception band widening request packet, the band controller unit 44 of the modem 121 of the accommodation station 120 calculates how many sub carriers in the descending reception band should be changed to the transmission band so as to widen the ascending transmission band by 32 kbps by the assigned sub carrier number calculation process shown in FIG. 11.

The band controller unit 44 of the modem 121 generates a transmission band widening request packet based on the calculation result, and transmits the transmission band widening request packet to the modem 111 of the subscriber 110. The band controller unit 44 of the modem 111 changes the sub carriers designated in the management table from the transmission band to the reception band in accordance with the information in the transmission band widening request packet, and also notifies the main signal transceiver unit 34 of the transmission stop of the designated sub carriers. The band controller unit 44 of the modem 111 then generates and transmits a band change response packet to the modem 121 of the accommodation station 120.

The band controller unit 44 of the modem 121 instructs the main signal transceiver unit 34 to start the ascending transmission through the designated sub carriers in accordance with the information in the band change response packet.

In the above manner, the communication band from the modem 121 of the accommodation station 120 to the modem 111 of the subscriber 110 can be widened by 32 kbps, while the communication band from the modem 11 of the subscriber 110 to the modem 121 of the accommodation station 120 can be narrowed by 32 kbps.

Figure 19:
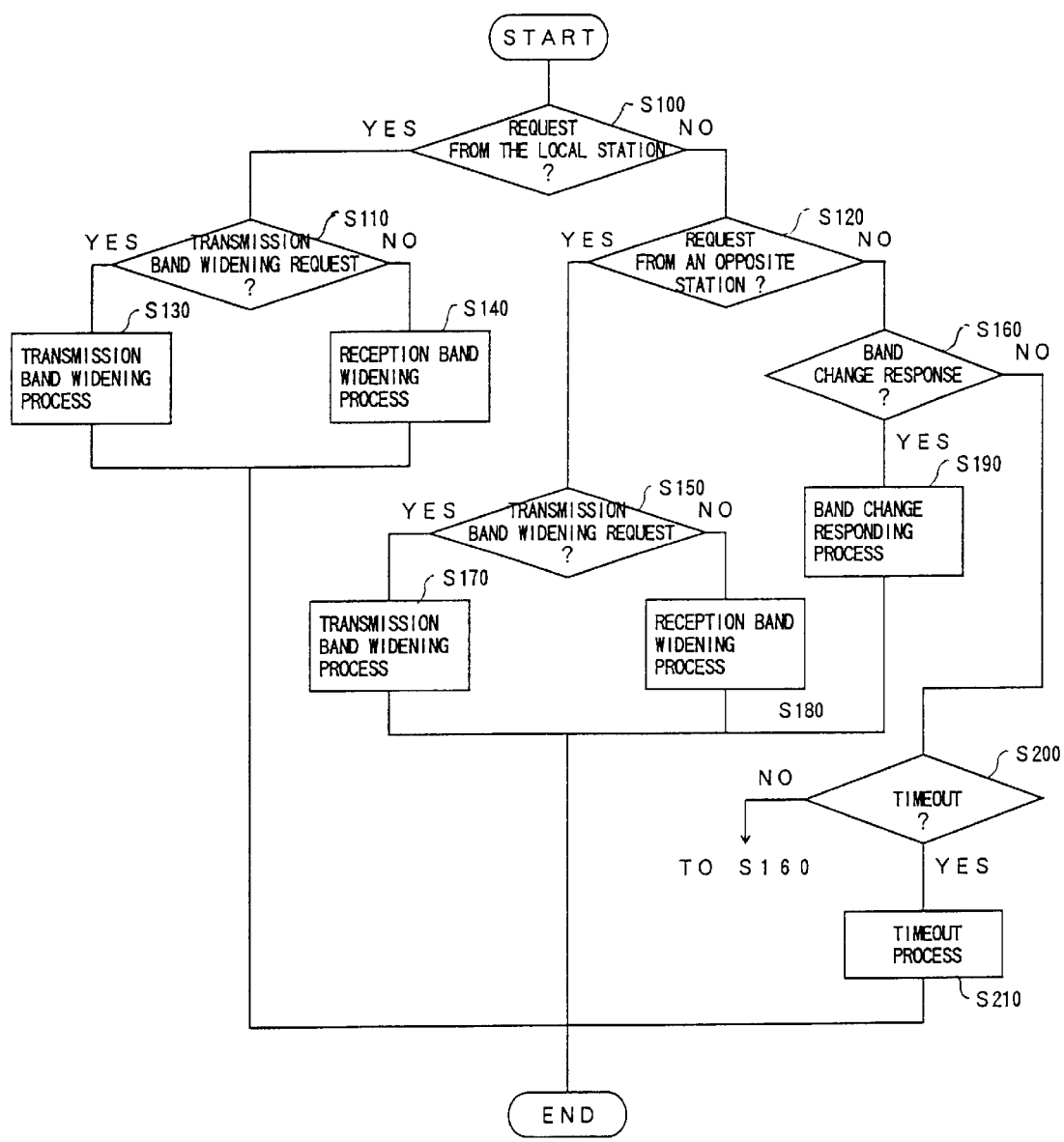
FIG. 19 is a flowchart of the operations shown in the sequence diagrams shown in FIGS. 14 and 17 carried out by the band controller unit.

FIG. 19 is a flowchart of the operations shown in the sequence diagrams shown in FIGS. 14 and 17 carried out by the band controller unit 44.

In step S100, the band controller unit 44 determines whether the supplied information is a request supplied from the local station, i.e., from the packet analyzer unit 40. If it is a request supplied from the local station, the operation moves on to step S110. If it is not a request supplied from the local station, the operation moves on to step S120.

In step S110, the band controller unit 44 determines whether the supplied request is a transmission band widening request. If it is a transmission band widening request, the operation moves on to step S130, and the band controller unit 44 carries out a transmission band widening process. If the supplied request is not a transmission band widening request, the operation moves on to step S140, and the band controller unit 44 carries out a reception band widening process.

In step S120, the band controller unit 44 determines whether the supplied information is a request supplied from an opposite station, i.e., from the control signal transceiver unit 42. If it is a request supplied from an opposite station, the operation moves on to step S150. If it is not a request supplied from an opposite station, the operation moves on to step S160.

In step S150, the band controller unit 44 determines whether the supplied request is a transmission band widening request. If it is a transmission band widening request, the operation moves on to step S170, and the band controller unit 44 carries out a transmission band widening process. If the supplied request is not a transmission band widening request, the operation moves on to step S180, and the band controller unit 44 carries out a reception band widening process.

In step S160, the band controller unit 44 determines whether the supplied information is a band change response. If it is a band change response, the operation moves on to step S190, and the band controller unit 44 carries out a band change response process. If the supplied information is not a band change response, the operation moves on to step S200.

In step S200, the band controller unit 44 determines whether a waiting time for the band change response has passed. If the waiting time has already passed, the operation moves on to step S210, and the band controller unit 44 carries out a timeout process. If the waiting time has not passed yet, the operation moves on to step S160.

Referring to FIGS. 20 through 24, the processes shown in the flowchart of FIG. 19 will now be described in greater detail.

Figure 20:
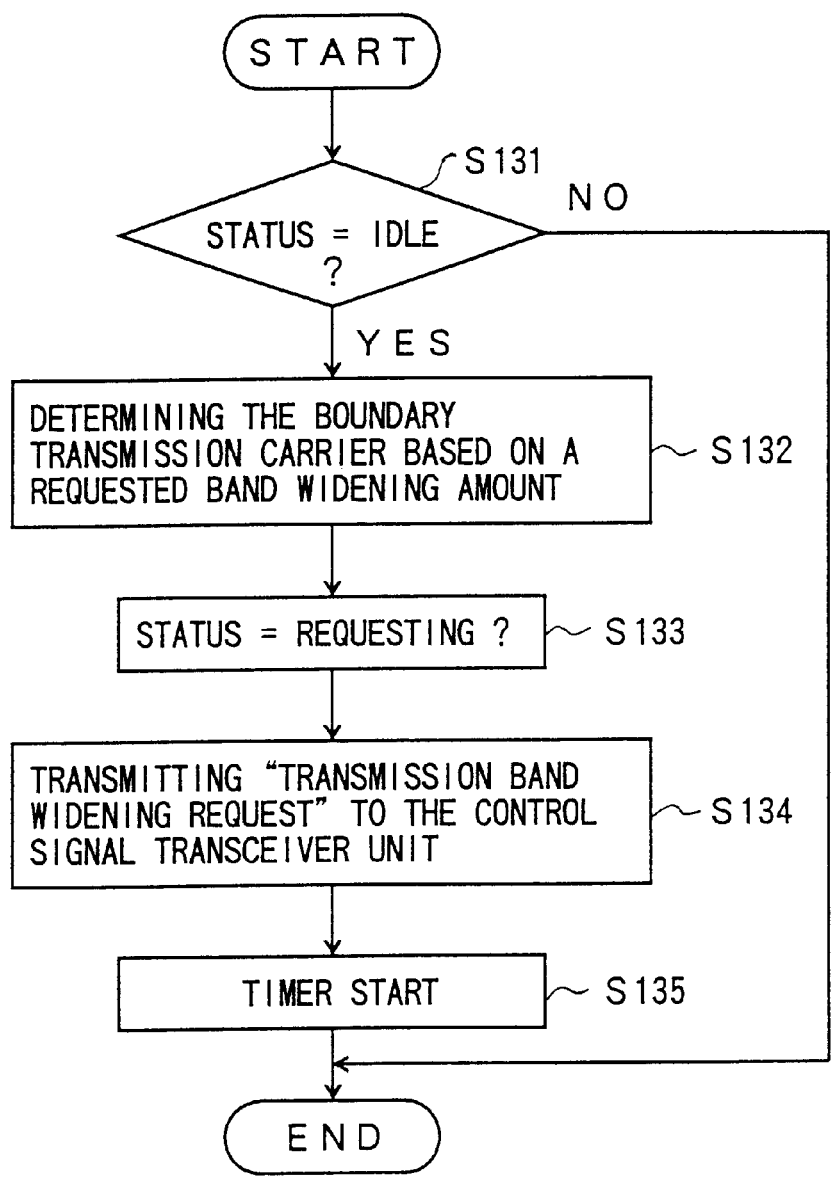
FIG. 20 is a flowchart of a transmission band widening process of S130 in the flowchart of FIG. 19.

FIG. 20 is a flowchart of the transmission band widening process of step S130 in the flowchart of FIG. 19. In step S131, the band controller unit 44 determines whether its status indicates an idle state. If the status indicates the idle state, the operation moves on to step S132. If the status does not indicate the idle state, the operation comes to an end.

In step S132, the band controller unit 44 carries out the assigned sub carrier number calculation process shown in FIG. 11 in accordance with a request transmission band increasing value, so as to determine the boundary between the transmission band and the reception band. In step S133, the band controller unit 44 changes its status to a requesting state.

In step S134, the band controller unit 44 supplies a transmission band widening request packet to the control signal transceiver unit 42. In step S135, the band controller unit 44 starts a timer for timing the waiting time for a band change response.

Figure 21:
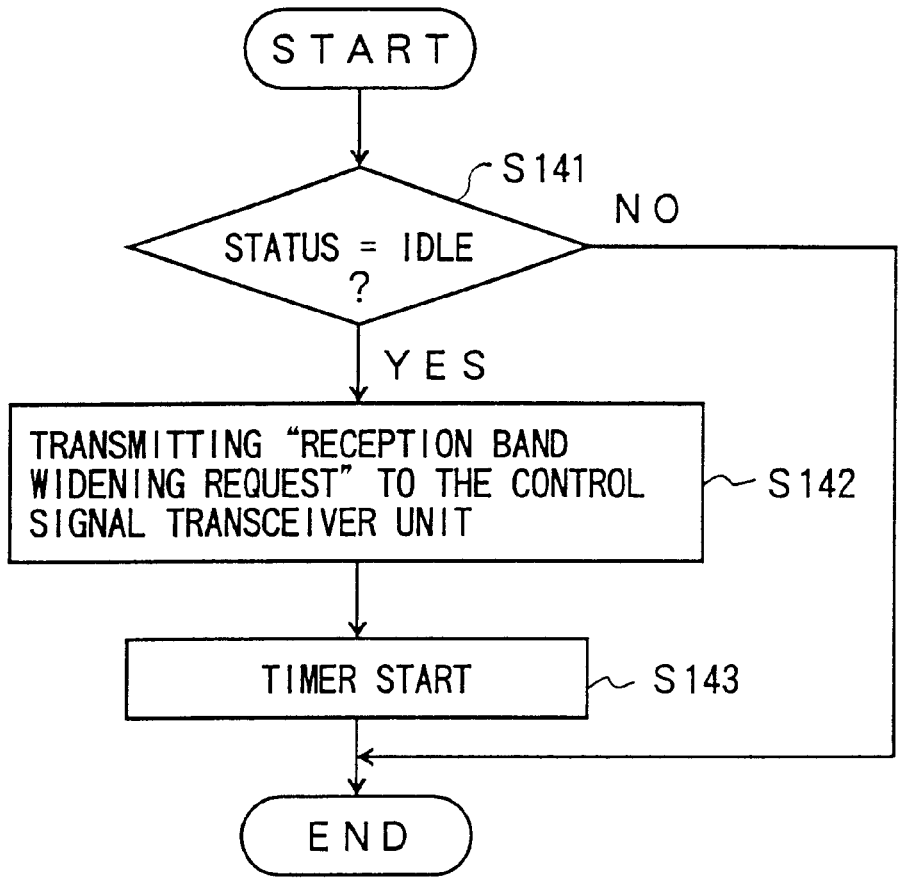
FIG. 21 is a flowchart of a reception band widening process of S140 in the flowchart of FIG. 19.

FIG. 21 is a flowchart of the reception band widening process of step S140 in the flowchart of FIG. 19. In step S141, the band controller unit 44 determines whether its status indicates the idle state. If the status indicates the idle state, the operation moves on to step S142. If the status does not indicate the idle state, the operation comes to an end.

In step S142, the band controller unit 44 generates a receipt band widening request packet in accordance with a requested reception band widening amount, and supplies the reception band widening request packet to the control signal transceiver unit 42. In step S143, the band controller unit 44 starts the time for timing the waiting time for a transmission band widening request.

Figure 22:
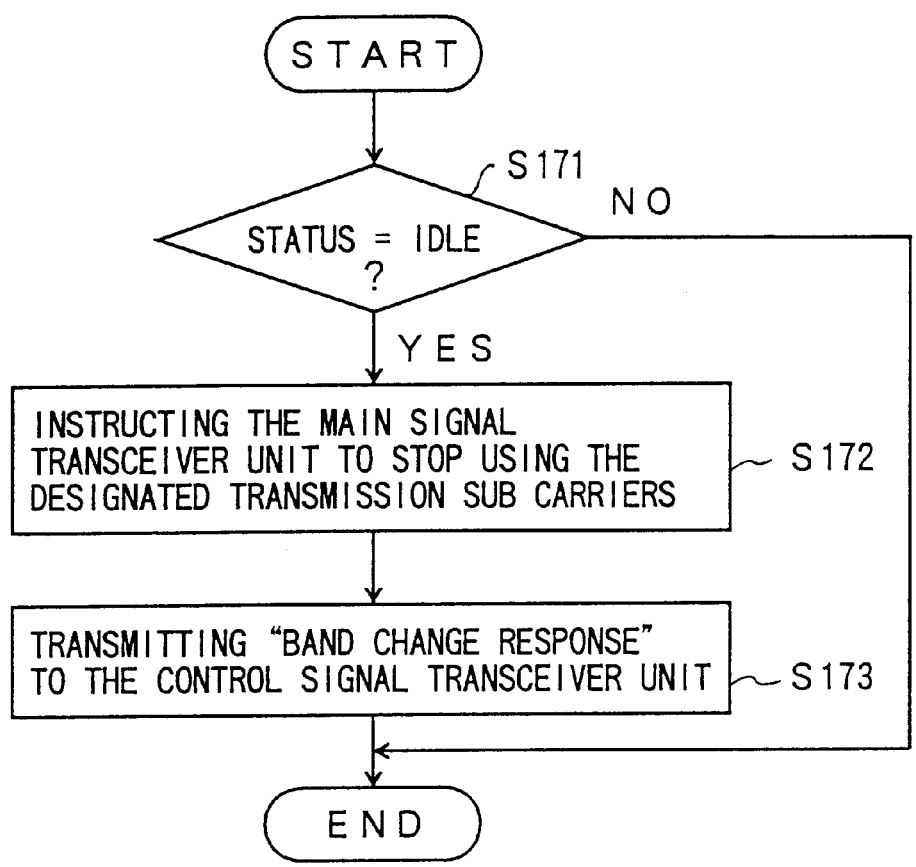
FIG. 22 is a flowchart of a transmission band widening process of S170 in the flowchart of FIG. 19.

FIG. 22 is a flowchart of the transmission band widening process of step S170 in the flowchart of FIG. 19. In step S171, the band controller unit 44 determines whether its status indicates the idle state. If the status indicates the idle state, the operation moves on to step S172. If the status does not indicate the idle state, the operation comes to an end.

In step S172, the band controller unit 44 instructs the main signal transceiver unit 34 to stop using sub carriers designated for transmission. In step S173, the band controller unit 44 supplies a band change response packet to the control signal transceiver unit 42.

The reception band widening process of step S180 in the flowchart of FIG. 19 is the same as the transmission band widening process of step S130. Therefore, a description for the reception band widening process of step S180 is omitted in this specification.

Figure 23:
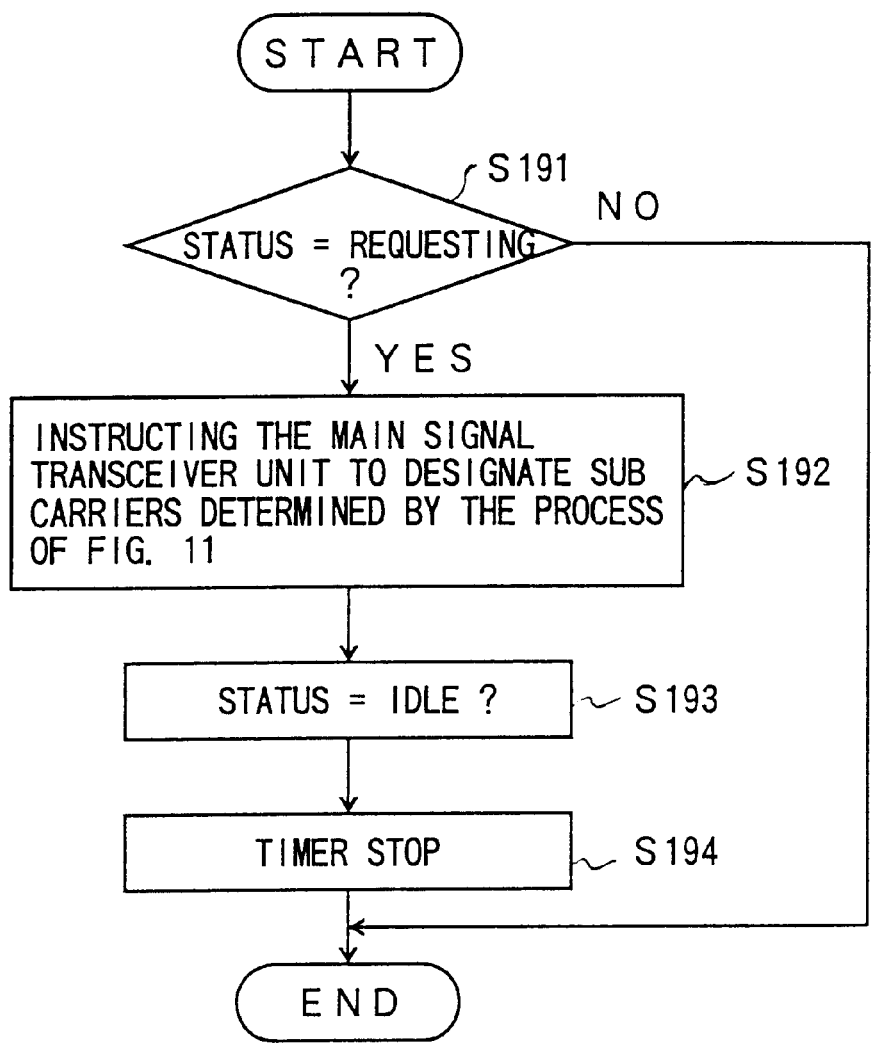
FIG. 23 is a flowchart of a band change response process of S190 in the flowchart of FIG. 19.

FIG. 23 is a flowchart of the band change response process of step S190 in the flowchart of FIG. 19. In step S191, the band controller unit 44 determines whether its status indicates the requesting state. If the status indicates the requesting state, the operation moves on to step S192. If the status does not indicate the requesting state, the operation comes to an end.

In step S192, the band controller unit 44 instructs the main signal transceiver unit 34 to change the sub carriers determined by the assigned sub carrier number calculation process of FIG. 11 to the transmission band. In step S193, the band controller unit 44 changes its status to the idle state. In step S194, the band controller unit 44 stops the timer for timing the waiting time for a band change response.

Figure 24:
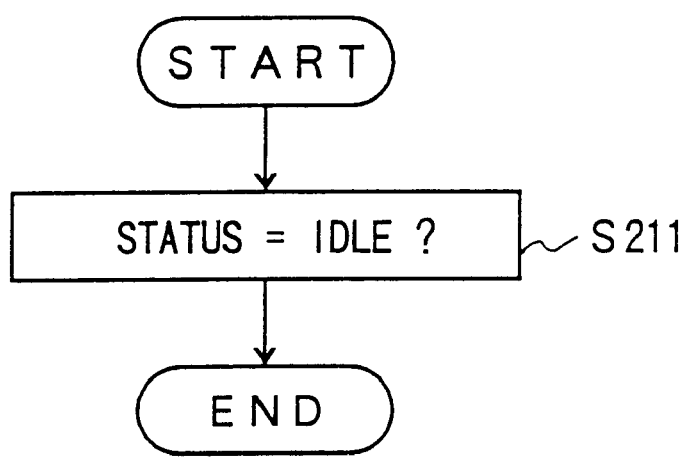
FIG. 24 is a flowchart of a timeout process of S210 in the flowchart of FIG. 19.

FIG. 24 is a flowchart of the timeout process of step S210 in the flowchart of FIG. 19. In step S211, the band controller unit 44 changes its status from the requesting state to the idle state when the waiting time exceeds a predetermined time.

Figure 25:
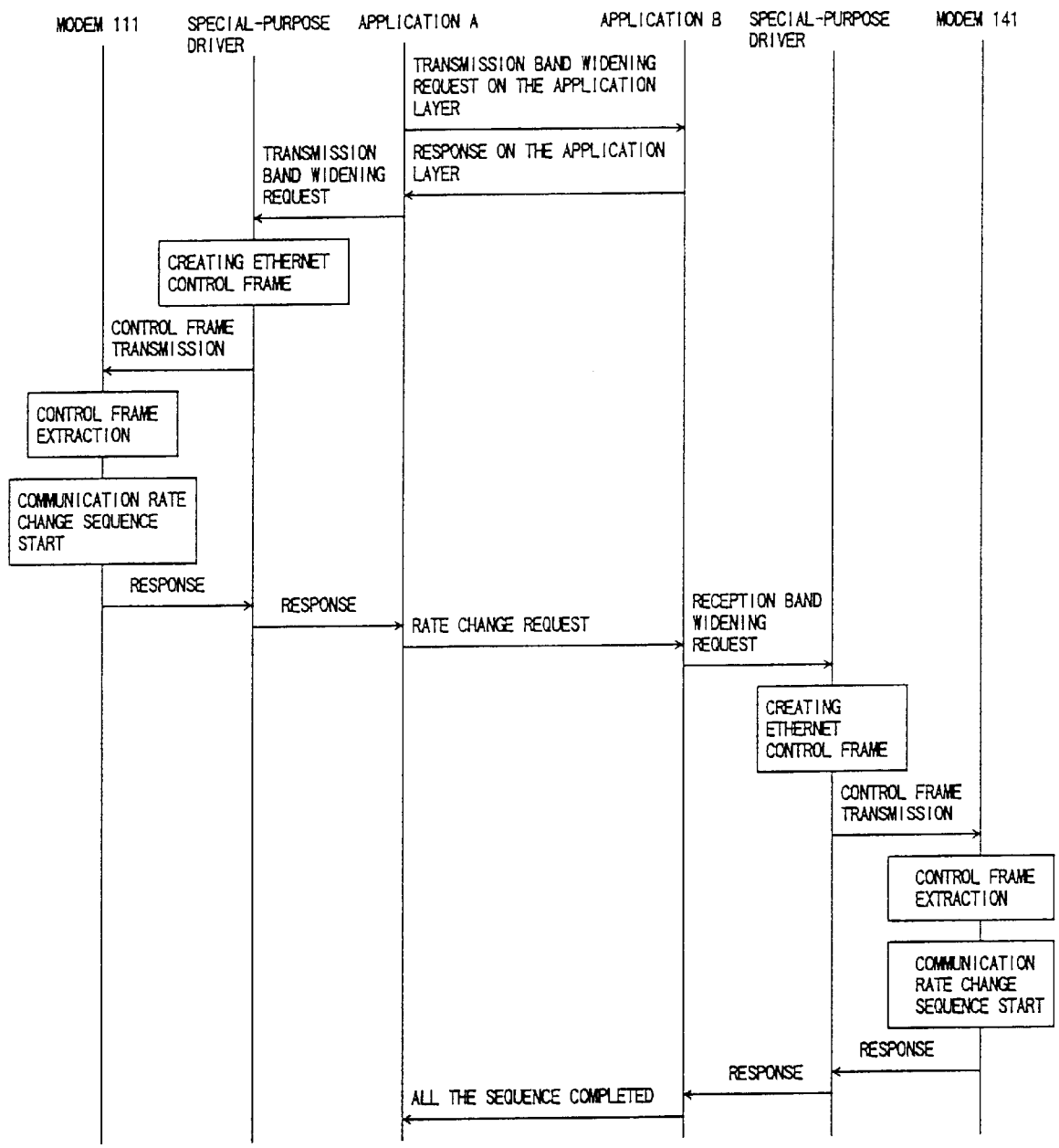
FIG. 25 is a sequence diagram of a communication band change process between the modems of the subscribers in the network shown in FIG. 12.

Next, in the network shown in FIG. 12, the interface between a terminal and a modem is set as Ethernet, and a video conference application in accordance with the TCP/IP (transmission control protocol/Internet protocol) is used between a terminal 112 and a terminal 142. FIG. 25 is a sequence diagram of a communication band change process between the modems of the subscribers in the network shown in FIG. 12.

In order to make a change to the communication band between the terminal 112 of the subscriber 110 and the terminal 142 of the subscriber 140, it is necessary to change the communication bands between the modem 111 and the modem 121, and between a modem 131 and a modem 141. After a negotiation for a communication band change on the application level between the terminal 112 and the terminal 142, the application of the terminal 112 sends a transmission band widening request to a special-purpose driver mounted on the terminal 112. Here, an API (application program interface) such as "ioctl ( )" can be used.

Upon receipt of the transmission band widening request, the special-purpose driver puts a transmission band widening request packet (shown in FIG. 26) in an Ethernet frame provided with a control signal identifier by an Ethernet control frame creating process. The special-purpose driver then transmits the Ethernet frame to the modem 111.

Figure 26:
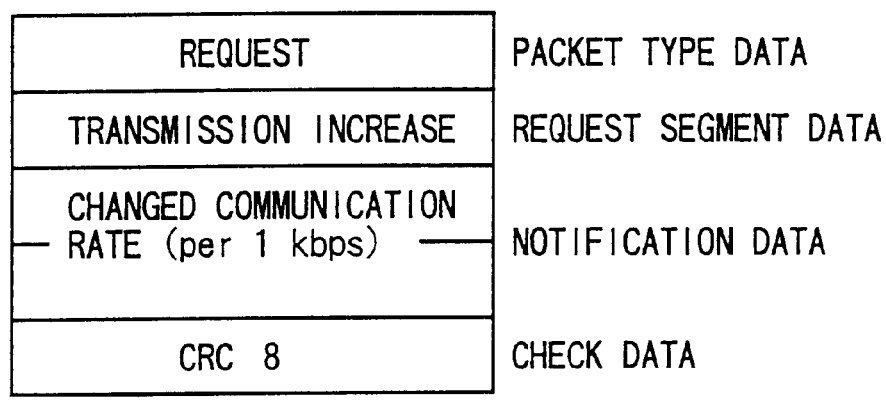
FIG. 26 shows an example structure of a transmission band widening request packet.

The external interface unit 32 of the modem 111 recognizes the transmission band widening request packet of FIG. 26, and supplies it to the packet analyzer unit 40. The packet analyzer unit 40 analyzes the transmission band widening request packet, and supplies the analysis to the band controller unit 44. In accordance with the supplied control information, the band controller unit 44 carries out the communication band change process described before.

Figure 27:
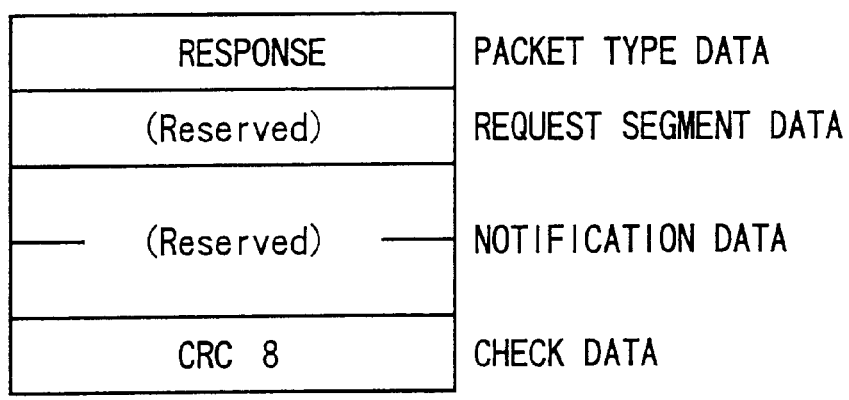
FIG. 27 shows an example structure of a band change response packet.

After the communication band change process, the band controller unit 44 of the modem 111 generates a band change response packet shown in FIG. 27. The external interface unit then puts the band change response packet in the Ethernet frame, and sends it to the terminal 112. The special-purpose driver mounted on the terminal 112 recognizes the band change response by an Ethernet control frame analyzing process, and notifies the application of the band change response.

After a negotiation with the application, the terminal 142 sends a reception band widening request to a special-purpose driver mounted on the terminal 142. Upon receipt of the reception band widening request, the special-purpose driver generates a reception band widening request packet shown in FIG. 28, and transmits it to the modem 141.

Figure 28:
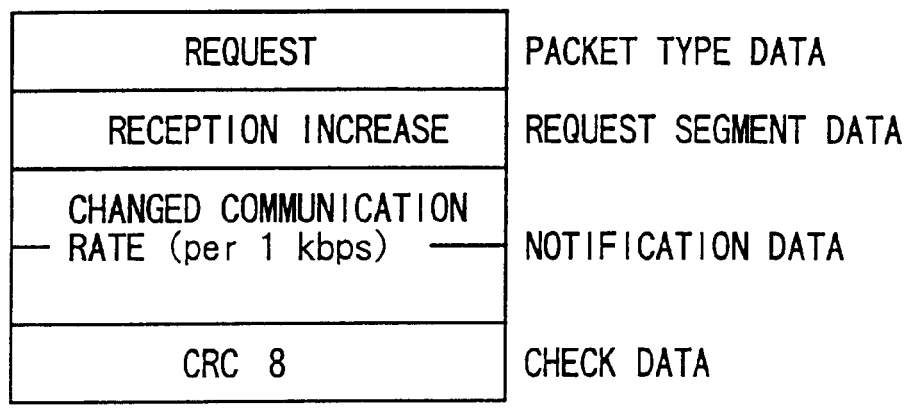
FIG. 28 shows an example structure of a reception band widening request packet.

The external interface unit 32 of the modem 141 recognizes the reception band widening request packet shown in FIG. 28, and supplies it to the packet analyzer unit 40. The packet analyzer unit 40 analyses the reception band widening request packet, and supplies the analysis to the band controller unit 44. In accordance with the supplied control information, the band controller unit 44 generates the reception band widening request packet shown in FIG. 18, and supplies it to the control signal transceiver unit 42.

The control signal transceiver unit 42 modulates the reception band widening request packet, and transmits it to the modem 131 of the opposite accommodation station 130 via the line driver unit 36. The modem 131 widens the communication band from the modem 131 to the modem 141 by carrying out the transmission band widening process. A notification of communication band change completion is then transmitted between the terminal 112 and the terminal 142 on the application level, thereby completing the process.

Figure 29:
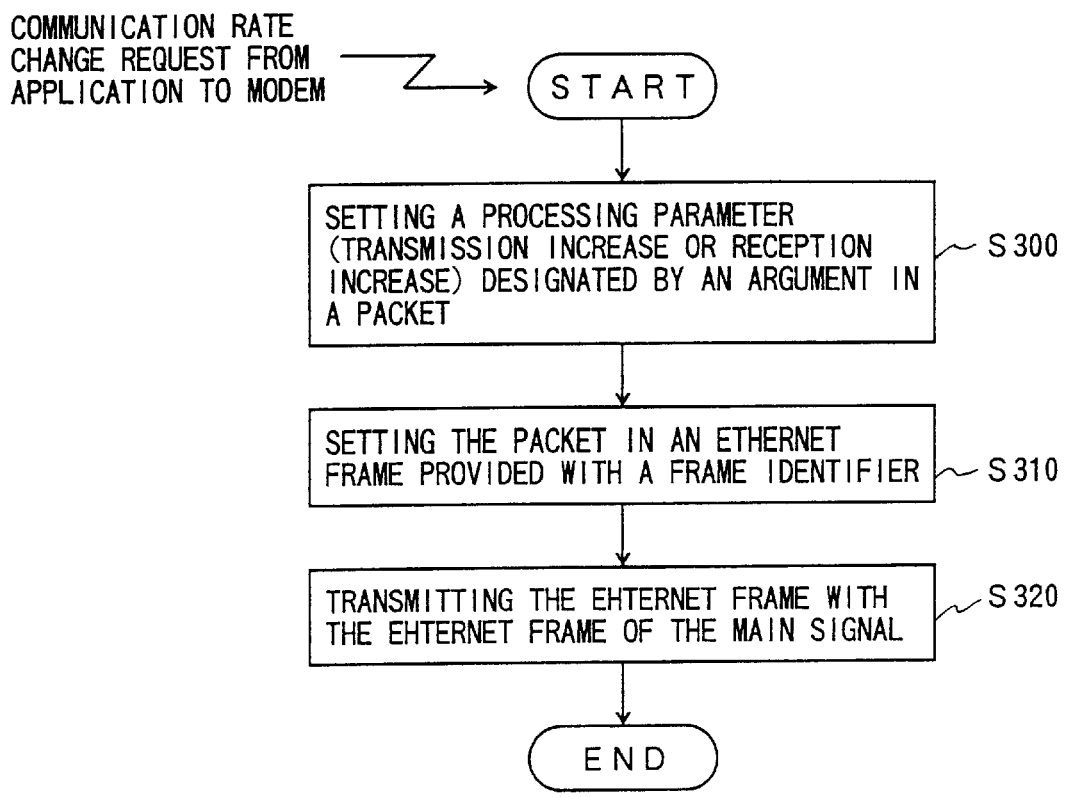
FIG. 29 is a flowchart of an Ethernet control frame creating process in the communication band change process shown in FIG. 25.

FIG. 29 is a flowchart of the Ethernet control frame creating process in the communication band change process shown in FIG. 25. In step S300, a processing parameter for widening the transmission band or the reception band designated by an argument is set in a transmission/reception band widening request packet. In step S310, the transmission/reception band widening request packet is put in the Ethernet frame provided with a control signal identifier. In step S320, the Ethernet frame provided with the control signal identifier is transmitted with other Ethernet frames.

FIG. 30 is a flowchart of the Ethernet control frame analyzing process in the communication band change process shown in FIG. 25. In step S400, the Ethernet frame provided with the control signal identifier is extracted. In step S410, the transmission/reception band widening request packet is detected from the extracted Ethernet frame, and the detection result is supplied to the application.

Figure 32:
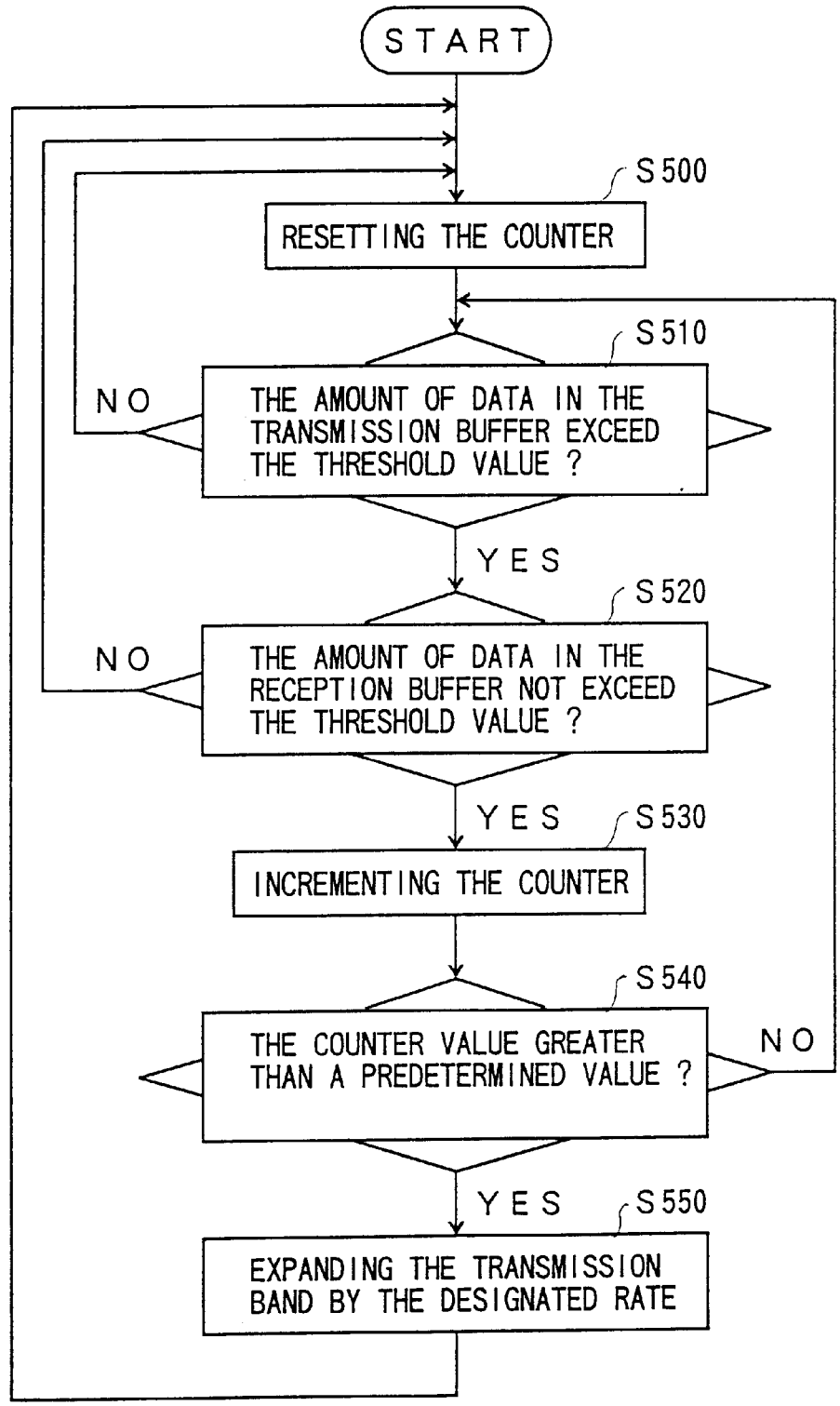
FIG. 32 is a flowchart of the operation of the buffer memory unit.

FIG. 31 shows an operation of the buffer memory unit 38 of the xDSL modem 30. FIG. 32 is a flowchart of the operation of the buffer memory unit 38. In this example, a large amount of data is accumulated in the transmission buffer in the buffer memory unit 38 due to a temporary increase of the transmission data.

As shown in FIG. 31, a transmission buffer threshold value and a reception buffer threshold value are set in the transmission buffer and the reception buffer, respectively, in the buffer memory unit 38. In FIG. 31, the amount of data accumulated in the transmission buffer exceeds the transmission buffer threshold, and the amount of data accumulated in the reception buffer does not exceed the reception buffer threshold value.

In step S500 in FIG. 32, an overflow counter is reset. In step S510, it is determined whether the amount of data accumulated in the transmission buffer exceeds the transmission buffer threshold value. If the amount of accumulated data exceeds the transmission buffer threshold, the operation moves on to step S520. If the amount of accumulated data does not exceed the threshold value, the operation returns to step S500.

In step S520, it is determined whether the amount of data accumulated in the reception buffer exceeds the reception buffer threshold value. If the amount of accumulated data does not exceed the reception buffer threshold value, the operation moves on to step S530. In step S530, the overflow counter is incremented. In step S520, if the amount of accumulated data exceeds the reception buffer threshold value, the operation moves back to step S500.

In step S540, it is determined whether the count value of the overflow counter is equal to or larger than a designated value. If the count value is equal to or larger than the designated value, the operation moves on to step S550. If the count value is smaller than the designated value, the operation returns to step S510, and the steps S510 to S540 are repeated.

In step S550, the buffer memory unit 38 notifies the band controller unit 44 that the transmission band needs to be widened. The communication band to be widened can be specified in advance.

In the above manner, the band controller unit 44 can adjust the transmission band and the reception band in accordance with the data accumulated in the buffer memory unit 38.

The present invention is not limited to the specifically disclosed embodiments, but variations and modifications may be made without departing from the scope of the present invention.

The present application is based on Japanese priority application No. 11-209118, filed on Jul. 23, 1999, the entire contents of which are hereby incorporated by reference.

What is claimed is:

1. A communication device comprising:

a transmission/reception unit that transmits and receives a data signal utilizing a plurality of sub carriers;

an information storage unit that stores information as to whether each of the plurality of sub carriers is used for transmission or reception; and a control unit that changes the information stored in the information storage unit in compliance with a control instruction, wherein a transmission and reception process of the transmission/reception unit is controlled in accordance with the information stored in the information storage unit, so as to adjust a transmission band and a reception band so that a change from the transmission band to the reception band precedes a change from the reception band to the transmission band, and wherein the control instruction is transmitted and received using at least two dedicated sub carriers selected from the plurality of sub carriers such that the at least two dedicated sub carriers are allocated to frequency bands that are lower in frequency than frequency bands assigned to all other sub carriers.

2. The communication device as claimed in claim 1, further comprising a control signal transceiver unit that demodulates a reception signal into the control instruction and supplies the control instruction to the control unit, and modulates the control instruction supplied from the control unit and outputs the modulated control instruction.

3. The communication device as claimed in claim 2, wherein the control unit changes information stored in an information storage unit of an external communication device that transmits and receives the data signal, so as to generate a control instruction to adjust a transmission band and a reception band of the external communication device.

4. The communication device as claimed in claim 1, further comprising an external interface unit that detects a control instruction from the data signal and supplies the control instruction to the control unit, and converts the control instruction supplied from the control unit and outputs the control instruction.

5. The communication device as claimed in claim 1, wherein the control unit controls the number of sub carriers used for transmission and the number of sub carriers used for reception among the plurality of sub carriers in accordance with the control instruction, so that the transmission band and the reception band are suitably adjusted.

6. The communication device as claimed in claim 5, wherein the transmission band and a reception band are adjusted by increasing the number of sub carriers used for one of the transmission band and the reception band, wherein the increased number is determined as a function of a requested communication rate and a number of bits calculated to be assigned to each of the sub carriers added in the increased number of sub carriers.

7. The communication device as claimed in claim 1, further comprising a memory unit that holds transmission data and reception data, and supplies the control instruction to the control unit when either the amount of transmission data or the amount of reception data exceeds a predetermined threshold value.

8. The communication device as claimed in claim 1, wherein the control instruction is transmitted as a transmission band widening request or a reception band widening request, by a packet.

9. A communication band setting method, comprising the steps of:

allocating at least two dedicated sub carriers selected from a plurality of sub carriers for transmitting and receiving a control instruction so that the at least two dedicated sub carriers are allocated to frequency bands that are lower in frequency than frequency bands assigned to all other sub carriers;

supplying the control instruction to adjust a transmission band and a reception band;

changing information as to whether each of other sub carriers in the plurality of sub carriers used for transmitting or receiving a signal is used for transmission or reception in accordance with the control instruction; and adjusting the transmission band and the reception band by carrying out a transmission process and a reception process, respectively, for each of the plurality of sub-carriers in accordance with the information.

\* \* \* \* \*